(12) United States Patent
Kiryu et al.

(10) Patent No.: US 12,198,207 B2
(45) Date of Patent: Jan. 14, 2025

(54) PRODUCTION ALLOCATION DETERMINING APPARATUS AND PRODUCTION ALLOCATION

(71) Applicant: FUJI ELECTRIC CO., LTD., Kanagawa (JP)

(72) Inventors: Satoshi Kiryu, Tokyo (JP); Yoshio Tange, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 17/236,294

(22) Filed: Apr. 21, 2021

(65) Prior Publication Data

US 2021/0241393 A1 Aug. 5, 2021

Related U.S. Application Data

(63) Continuation-in-part of application No. 16/166,540, filed on Oct. 22, 2018, now abandoned.

(30) Foreign Application Priority Data

Dec. 18, 2017 (JP) ................... 2017-241907

(51) Int. Cl.
*G06Q 50/06* (2024.01)
*G06Q 10/0631* (2023.01)
*G06Q 10/067* (2023.01)

(52) U.S. Cl.
CPC ....... *G06Q 50/06* (2013.01); *G06Q 10/06315* (2013.01); *G06Q 10/067* (2013.01)

(58) Field of Classification Search
CPC . G06Q 50/06; G06Q 10/06315; G06Q 10/067
See application file for complete search history.

(56) References Cited

U.S. PATENT DOCUMENTS

2011/0035071 A1* 2/2011 Sun ................. G05B 15/02
700/291
2017/0083989 A1* 3/2017 Brockman ............. G06Q 50/06

FOREIGN PATENT DOCUMENTS

EP 3188115 7/2017
JP H05-056562 3/1993
(Continued)

OTHER PUBLICATIONS

WO 2016075805 machine translation. (Year: 2016).*
(Continued)

*Primary Examiner* — Francis Z. Santiago Merced
(74) *Attorney, Agent, or Firm* — IPUSA, PLLC

(57) ABSTRACT

A production allocation determining apparatus is configured to calculate a total supply function model representing a relationship between a total supply quantity and a marginal cost; calculate, based on current supply quantities, change rate constraints, and on capacity upper and lower limits, supply quantity upper and lower limits of the respective producers at a time s; calculate an optimum price based on the total supply function model, a predicted value of a demanded quantity at the time s, and on the supply quantity upper and lower limits; and calculate, based on the supply quantity upper and lower limits, the supply function models, and on the optimum price, optimum supply quantities. Calculation of the supply quantity upper and lower limits, calculation of the optimum price, and calculation of the optimum supply quantities are repeatedly executed from the time s=T to the time s=1.

8 Claims, 24 Drawing Sheets

(56) References Cited

FOREIGN PATENT DOCUMENTS

| JP | H11-328239 | 11/1999 |
|---|---|---|
| JP | 2009-022137 | 1/2009 |
| JP | 2011-114919 | 6/2011 |
| JP | 2012-178929 | 9/2012 |
| JP | 2013-198177 | 9/2013 |
| WO | 2016/075805 | 5/2016 |

OTHER PUBLICATIONS

Wood et al.; Power generation, operation and control; 2013 (Year: 2013).*
Hachiro Isoda, "On-Line Load Dispatching Method Considering Load Variation Characteristics and Response Capabilities of Thermal Units", Journal of the Institute of Electrical Engineers of Japan, vol. 101, No. 11, pp. 683-689, with translation of the relevant part.
The Institute of Electrical Engineers of Japan, "Recommended practice for simulation models for automatic generation control", Technical report of the Institute of Electrical Engineers of Japan, vol. 1386, pp. 83-86, with translation of the relevant part.
Masakazu Kato, "Electric Power System", Tokyo Denki University Press, pp. 261-265, with translation of the relevant part.
Hirokazu Anai et al., "Algorithms of Quantifier Elimination and their Applications-Optimization by Symbolic and Algebraic Methods-", Tokyo University Press, 2011, pp. 214-221, with translation of the relevant part.
Yoshio Tange et al., "Visualization of Optimal Supply and Demand Balance by Quantifier Elimination Approach", The Society of Instrument and Control Engineers 13th ROMBUNNO.8C2-5, with English Abs.

* cited by examiner

PRODUCTION ALLOCATION DETERMINING APPARATUS AND PRODUCTION ALLOCATION

CROSS-REFERENCE TO RELATED APPLICATION

The present application is a continuation-in-part application of U.S. patent application Ser. No. 16/166,540 filed on Oct. 22, 2018, which is based on and claims priority to Japanese Application No. 2017-241907 filed on Dec. 18, 2017, the entire contents of which are hereby incorporated by reference.

BACKGROUND OF THE INVENTION

1. Field of the Invention

The present invention relates to a production allocation determining apparatus and a production allocation determining method.

A method for determining an optimal cost when allocating products (e.g., various resources such as electricity, gas, or steam) produced by a plurality of producers (e.g., various facilities or devices such as electricity generation facilities, gas production facilities, or boilers) is known in the related art. A method for determining an optimal cost when allocating production quantitys of a product produced in production lines is known in the related art.

For example, a method of determining optimum allocations by a quadratic programming method in consideration of predictions of a demanded quantity and change rate constraints of producers is known in the related art (for example, see Patent Document 1). A method of calculating, from a relationship between a total supply quantity and a marginal cost in an entire demand-supply system, an optimum price in accordance with a given demanded quantity to calculate optimum supply quantity allocations is also known in the related art (for example, see Patent Document 2). A method of calculating optimum allocations by an equal $\lambda$ method in consideration of predictions of a demanded quantity of electricity or the like and change rate constraints of producers is also known in the related art (for example, see Patent Documents 3 to 6 and Non-Patent Document 1).

Further, a method of calculating optimum allocations by an equal $\lambda$ method in consideration of supply upper limits and supply lower limits of producers is known in the related art (for example, see Non-Patent Documents 2 and 3). When an equal $\lambda$ method is used to calculate an allocation of each producer by using a calculated marginal cost, there may be a case in which a calculated allocation violates the supply upper limit or the supply lower limit. In such a case, according to the method disclosed in Non-Patent Document 2, the allocation of a violating producer is fixed to the supply upper limit or the supply lower limit, and the marginal costs and the allocations are calculated again for unfixed producers. Conversely, according to the method disclosed in Non-Patent Document 3, in a case where there is a producer that violates the supply upper limit or the supply lower limit, an optimum marginal cost is calculated by repeating a process of slightly changing the value of the marginal cost once calculated and calculating the allocation corresponding to the changed marginal cost until no violation occurs.

Further, a method of optimizing a system by representing a problem of system control or circuit analysis by a first-order predicate logic formula or solving the first-order predicate logic formula is known in the related art (for example, see Non-Patent Document 4).

Specifically, a first-order predicate logic formula is obtained by combining logical formulas coupled by using quantifiers represented by a universal quantifier ($\forall$) and an existence quantifier ($\exists$) and using logic symbols represented by a conjunction ($\wedge$) and a disjunction ($\vee$) of multivariate polynomial equations or inequalities. Among variables appearing in logical formulas, variables bound by quantifiers are called bound variables, and variables that are not bound by qualifiers are called free variables. Optimization is aimed at by eliminating bound variables in a first-order predicate logic formula and deriving logical formulas to be satisfied by free variables.

Also, a method of using a qualifier elimination design and analyze a control method to system is known (for example, see Patent Document 7).

According to this method, a control system analyzing/designing apparatus formulates, as Linear Matrix Inequality (LMI) or Bilinear Matrix Inequality (BMI), an input control problem. Then, constraints such as design specifications formulated as LMI or BMI are transformed into constraints of the form in which inequalities are connected by logical disjunction, and a control system is converted into a first-order predicate logic formula to analyze the control system from a formula from which variables bounded by qualifiers are eliminated.

With respect to a technique for analyzing the energy of a plant, a method of generating a first-order predicate logic formula and solving this first-order predicate logic formula to perform analysis is known in the related art (for example, see Non-Patent Document 5).

RELATED-ART DOCUMENTS

Patent Documents

[Patent Document 1] Japanese Laid-open Patent Publication No. 2011-114919
[Patent Document 2] International Publication Pamphlet No. WO 2016/075805
[Patent Document 3] Japanese Laid-open Patent Publication No. 05-56562
[Patent Document 4] Japanese Laid-open Patent Publication No. 2009-22137
[Patent Document 5] Japanese Laid-open Patent Publication No. 2012-178929
[Patent Document 6] Japanese Laid-open Patent Publication No. 2013-198177
[Patent Document 7] Japanese Laid-open Patent Publication No. 11-328239

Non-Patent Documents

[Non-Patent Document 1] Hachiro Isoda, "On-Line Load Dispatching Method Considering Load Variation Characteristics and Response Capabilities of Thermal Units", Journal of The Institute of Electrical Engineers of Japan, Vol. 101, No. 11, pp. 683-689
[Non-Patent Document 2] The Institute of Electrical Engineers of Japan, "Recommended practice for simulation for automatic generation control", Technical report of The Institute of Electrical Engineers of Japan, Vol. 1386, pp. 83-86
[Non-Patent Document 3] Masakazu Kato, "Electric Power System", Tokyo Denki University Press, pp. 261-265
[Non-Patent Document 4] Hirokazu Anai and Kazuhiro Yokoyama, "Algorithms of Quantifier Elimination and their Applications-Optimization by Symbolic and Algebraic Methods-", Tokyo University Press, 2011, pp. 214-221

[Non-Patent Document 5] Yoshio Tange, Satoshi Kiryu, Tetsuro Matsui, and Yoshikazu Fukuyama "Visualization of Optimal Supply and Demand Balance by Quantifier Elimination Approach", The Society of Instrument and Control Engineers 13th ROMBUNNO. 8C2-5

Generally, a demanded quantity of a product changes from moment to moment due to various situations. Therefore, in order to procure a necessary sufficient product while suppressing a procurement cost as a whole, the supply quantity of each producer is required to be appropriately allocated in accordance with a demand quantity.

For example, in the conventional method disclosed in Patent Document 1, an optimal allocation is calculated by solving a quadratic programming problem. Although this enables to calculate optimum allocations in considerations of a prediction of demanded quantity and change rate constraints of producers, it may be difficult to solve a solution in an environment where calculation resources such as PLC (Programmable Logic Controller) are limited. Conversely, for example, according to the conventional method disclosed in Patent Document 2, although it is easy to obtain a solution, it is not possible obtain optimum allocations in consideration of predictions of a demanded quantity and change rate constraints of producers.

Also, for example, as disclosed in Patent Documents 3 to 6 and Non-Patent Documents 1 to 3, according to a method using an equal $\lambda$ method, in a case where the optimum allocation is the supply upper limit or the supply upper limit of a producer when calculating the optimal allocation at each time, it is required to calculate the marginal cost and calculate the allocation based on the marginal cost repeatedly. Thus, it may take time to calculate optimum allocations. In view of the above, an object of an embodiment of the present invention is to determine, at high speed, optimum allocations in consideration of predictions of a demanded quantity and in consideration of change rate constraints of producers.

SUMMARY OF THE INVENTION

In view of the above object, according to an embodiment of the present invention, a production allocation determining apparatus determines optimum allocations of supply quantities to be produced and supplied by a plurality of producers at each time s (s=1, 2, . . . , T). The production allocation determining apparatus includes: a total supply function calculation unit configured to calculate, from supply function models representing relationships between supply quantities and marginal costs of the respective producers, a total supply function model representing a relationship between a total supply quantity and marginal cost of the plurality of producers; an upper and lower limit calculation unit configured to calculate, based on current supply quantities of the respective producers, based on change rate constraints of the supply quantities of the respective producers, and based on capacity upper limits and capacity lower limits indicating upper limits and lower limits of supply capacities of the respective producers, supply quantity upper limits and supply quantity lower limits indicating upper limits and lower limits of the supply quantities of the respective producers at a time s; an optimum price calculation unit configured to calculate an optimum price indicating a marginal cost at the time s based on the total supply based on a predicted value of a demanded quantity at the time s, and based on the supply quantity upper limits and the supply quantity lower limits; and a supply quantity calculation unit configured to calculate, based on the supply quantity upper limits and the supply quantity lower limits of the respective producers at the time s, based on the supply function models of the respective producers, and based on the optimum price at the time s, optimum supply quantities indicating allocations of the supply quantities of t respective producers at the time s, wherein calculation of the supply quantity upper limits and the supply quantity lower limits by the upper and lower limit calculation unit, calculation of the optimum price by the optimum price calculation unit, and calculation of the optimum supply quantities by the supply quantity calculation unit are repeatedly executed from the time s=T to the time s=1.

It is possible to determine, at high speed, optimum allocations in consideration of predictions of a demanded quantity and in consideration of change rate constraints of producers.

DETAILED DESCRIPTION OF THE EMBODIMENTS

Figure 1:
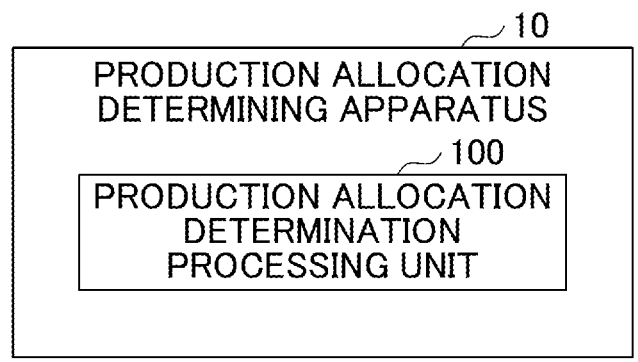
FIG. 1 is a diagram illustrating an example of a configuration of a production allocation determining apparatus according to an embodiment.

In the following, an embodiment of the present invention will be described with reference to the accompanying drawings. A production allocation determining apparatus 10 that determines, in consideration of predictions of a demanded quantity and change rate constraints of a plurality of producers, optimum allocations of a product to be supplied by the plurality of producers to a demander will be described below.

Note that the producers are various facilities, devices, equipment, or the like that produce and supply a product. Specific examples of the producers include electric generating facilities that produce and supply electricity (electric power) as a product, gas producing facilities that produce and supply gas, boilers that produce and supply steam. The demander (customer) may be various facilities, devices, or the like that demand a product produced by the producers. Specific examples of the demander include various electric facilities that demand electricity, electricity generation facilities that demand gas, and turbines that demand steam. However, the product is not limited to resources such as electricity, gas and steam. The product may be, for example, goods such as a work-in-process product, a semifinished product, or the like that can be produced by producers processing a raw material.

Also, the change rate constraint is a constraint condition representing a quantity and/or a rate at which a producer can change the production quantity of a product per unit time, for example. Note that the change rate constraint may be a differing value for the case of decreasing the production quantity and for the case of increasing the production quantity.

In the present embodiment, all of the products produced by a plurality of respective producers are supplied to a demander. Therefore, in the present embodiment, at cross sections s (s=1, 2, . . . , T) representing future times for which allocations of the producers are determined, the production quantities and the supply quantities of the respective producers match. Also, the plurality of producers are called producers k (k=1, 2, . . . , N). T is a predetermined integer that is one or more. N is a total number of producers.

Also, for convenience sake, a cross section s=0 is taken as the current time. Note that a time interval $\Delta s$ between the cross sections s (i.e., a time interval $\Delta s$ between a cross section s+1 and a cross section s) is determined as desired. The time interval $\Delta s$ may be constant but is not required to be constant. The time interval $\Delta s$ may differ for each s.

Each producer k needs a marginal cost in accordance with to its supply quantity when producing the product. The marginal cost is the cost that is required for additional production of one unit of product.

The relationship between a supply quantity of and a marginal cost of each producer k is represented by a supply function model $C'[k]$. The supply function models $C'[k]$ of the respective producers k are given in advance to the production allocation determining apparatus 10.

Further, change rate constraints $\delta[k]$ of the respective producers k are given in advance to the production allocation determining apparatus 10.

<Configuration of Production Allocation Determining Apparatus 10>

First, a configuration of the production allocation determining apparatus 10 according to the present embodiment will be described with reference to FIG. 1. FIG. 1 is a diagram illustrating an example of the configuration of the production allocation determining apparatus 10 according to the present embodiment.

As illustrated in FIG. 1, the production allocation determining apparatus 10 according to the present embodiment includes a production allocation determination processing unit 100. The production allocation determining apparatus 10 according to the present embodiment causes the production allocation determination processing unit 100 to determine, in consideration of predictions of a demanded quantity and in consideration of change rate constraints of respective producers k, optimum allocations for the respective producers k.

Upon predicted values $L[s]$ of demanded quantities at respective cross sections s (s=1, 2, . . . . T) (hereinafter simply referred to as "demanded quantity predicted values") and current values $P[k][0]$ of the production quantities of the respective producers k being input, the production allocation determination processing unit 100 calculates supply upper limits $\max[k][s]$ and supply lower limits $\min[k][s]$ of the respective producers k at the cross section s=T.

Note that the supply upper limits $\max[k][s]$ are the upper limit quantities of a product that can be supplied by the producers k at the cross section s. Similarly, the supply lower limits $\min[k][s]$ are the lower limit quantities of the product that can be supplied by the producers k at the cross section s.

Next, the production allocation determination processing unit 100 determines, based on a total supply function model $\varphi$ that is obtained from supply function models $C'[k]$ of the respective producers k, based on a demanded quantity predicted value $L[s]$ at the cross section s=T, based on the supply upper limits $\max[k][s]$ at the cross section s=T, and based on the supply lower limits $\min[k][s]$ at the cross section s=T, an optimum price predicted value $\lambda[s]$ indicating a marginal cost at the cross section s=T.

Then, based on the supply function models $C'[k]$ of the respective producers k and based on the optimum price predicted value $\lambda[s]$ at the cross section s=T, the production allocation determination processing unit 100 determines predicted values $P[k][s]$ of the supply quantities of the respective producers k at the cross section s=T. The predicted values $P[k][s]$ are allocations of production quantities of the respective producers k at the cross section s=T. In the following, predicted values $P[k][s]$ may also be referred to as "optimum supply quantity predicted values $P[k][s]$".

Upon determining the optimum supply quantity predicted values P[k][s] of the respective producers k at the cross section s, the production allocation determination processing unit 100 sets the cross section S to s−1 (that is, the production allocation determination processing unit 100 shifts the cross section's towards the past by one cross section). Then, the production allocation determination processing unit 100 calculates, based on the optimum supply quantity predicted values P[k][s+1] of the respective producers k at the cross section s+1, supply upper limits max[k][s] and supply lower limits min[k][s]. Then, the production allocation determination processing unit 100 determines the optimum price predicted value λ[s] at the cross section S and the optimum supply quantity predicted values P[k][s] of the respective producers k at the cross section s.

In this way, by repeating, while shifting from the cross section s=T to the cross section s=1 towards the past one by one, the calculation of supply upper limits max[k][s] and supply lower limits min[k][s], the production allocation determination processing unit 100 determines the optimum supply quantity predicted values P[k][s] of the respective producers k at each of the respective cross sections s.

The production allocation determination processing unit 100 controls the supply quantities supplied from the respective producers k based on the determined optimum supply quantity predicted values P[k][s] of the respective producers k at each of the respective cross sections s. For example, the production allocation determination processing unit 100 may send instructions to the respective producers k to cause the respective producers k to physically transfer and supply industrial energy resources, such as electric power, gas, or steam, by the determined optimum supply quantity predicted values P[k][s] of the respective producers k at each of the respective cross sections s.

The production allocation determining apparatus 10 and the plurality of producers, for which optimum allocations are determined, may be included in a single system.

Note that the production allocation determination processing unit 100 may be actualized by a process that at least one program, installed in the production allocation determining apparatus 10 according to the present embodiment, a causes CPU (Central Processing Unit) 17 to execute.

<Hardware Configuration>

Figure 2:
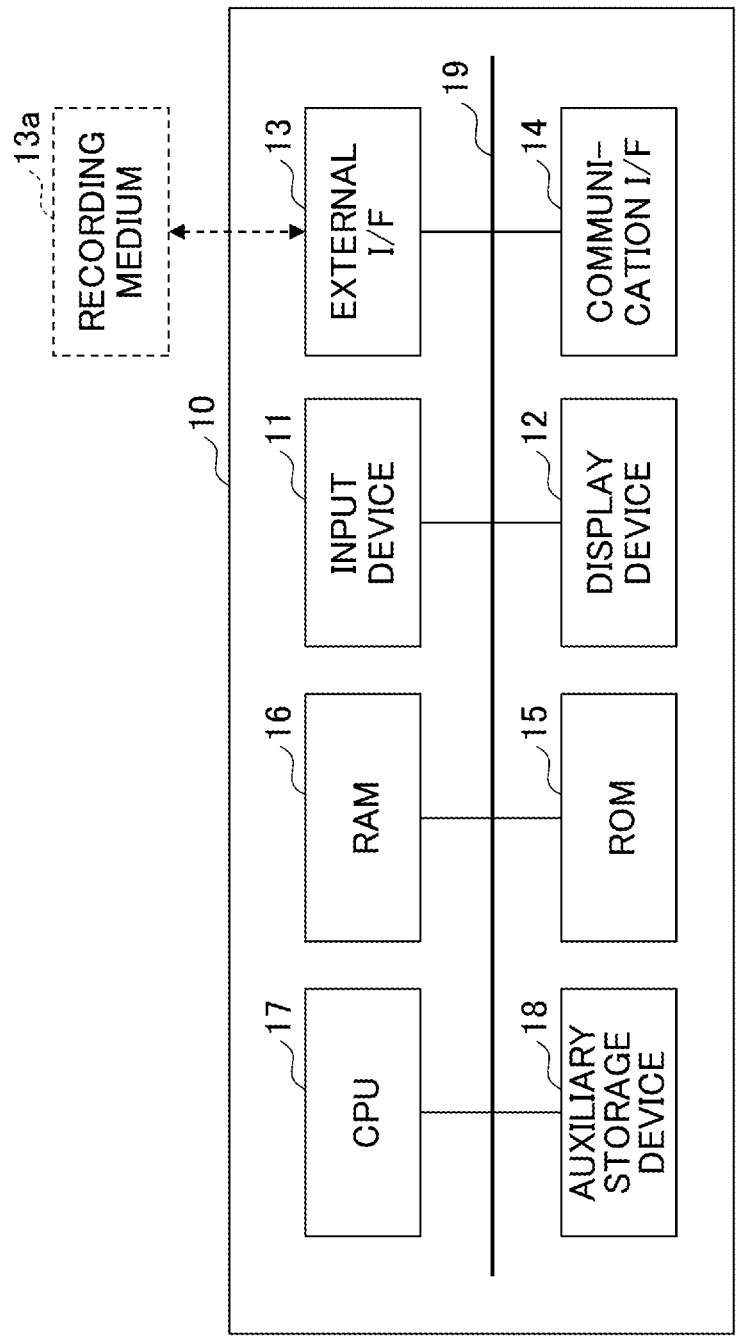
FIG. 2 is a block diagram illustrating an example of a hardware configuration of the production to the allocation determining apparatus according present embodiment.

Next, a hardware configuration of the production allocation determining apparatus 10 according to the present embodiment will be described with reference to FIG. 2. FIG. 2 is a block diagram illustrating an example of the hardware configuration of the production allocation determining apparatus 10 according to the present embodiment.

As illustrated in FIG. 2, the production allocation determining apparatus 10 according to the present embodiment includes an input device 11, a display device 12, an external I/F 13, a communication I/F 14, a Read Only Memory (ROM). 15, a Random Access Memory (RAM) 16, a Central Processing Unit (CPU) 17, and an auxiliary storage device 18. These hardware elements are coupled with each other via a bus 19.

For example, the input device 11 may include a keyboard, a mouse, a touch panel, various buttons, and the like. A user can use the input device 11 to input various operations to production allocation the determining apparatus 10. The display device 12 includes a display and the like to display a result of various processes by the production allocation determining apparatus 10, for example. Note that the production allocation determining apparatus 10 is not required to have both the input device 11 and the display device 12.

The external I/F 13 is an interface with an external apparatus. The external apparatus may be a recording medium 13a or the like. The production allocation determining apparatus 10 can read information (data) from the recording medium 13a and write information (data) on the recording medium 13a through the external I/F 13. For example, the recording medium 13a may be a medium such as a Compact Disk (CD), a Digital Versatile Disk (DVD), a SD memory card, or a Universal Serial Bus (USB) memory. Note that at least one program that realizes the production allocation determination processing unit 100 may be stored in the recording medium 13a.

The communication I/F 14 is an interface for the production allocation determining apparatus 10 to perform data communication with another apparatus, for example. Note that at least one program that realizes the production allocation determination processing unit 100 may be obtained (downloaded) from a predetermined server or the like via the communication I/F 14.

The ROM 15 is a non-volatile semiconductor memory that can hold (store) one or more programs and/or data even when a power source is powered off. The RAM 16 is a volatile semiconductor memory that temporarily holds (stores) one or more programs and/or data. The CPU 17 is an arithmetic device that reads, from the ROM 15 or the auxiliary storage device 18, for example, the program (s) and/or the data onto the RAM 16 to execute various kinds of processes.

The auxiliary storage device 18 is a non-volatile storage memory that stores programs and/or data such as a Hard Disk Drive (HDD) or a Solid State Drive (SDD), for example. The programs and/or data stored in the auxiliary storage device 18 may include at least one program that actualizes the production allocation determination processing unit 100, an operating system (OS), which is basic software, and various application programs that provides various functions in the OS, and so on.

The production allocation determining apparatus 10 according to the present embodiment has a configuration as illustrated in FIG. 2 to hardware actualize various will be described processes, which Note that although FIG. 2 illustrates an later below example of a hardware configuration in a case where the production allocation determining apparatus 10 is realized by one computer, the production allocation determining apparatus 10 may be realized by a plurality of computers.

<Functional Configuration of Production Allocation Determination Processing Unit 100>

Figure 3:
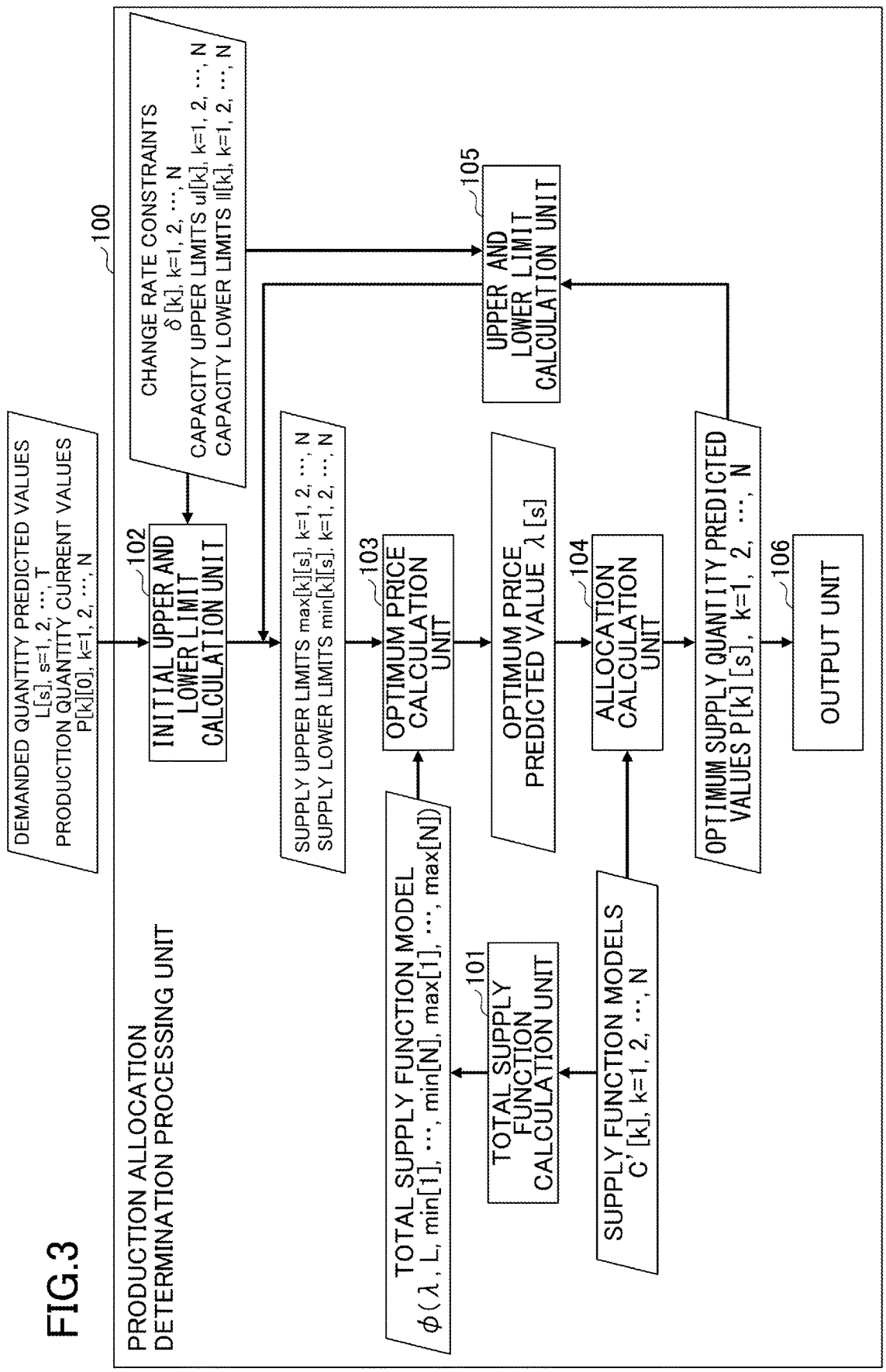
FIG. 3 is a diagram illustrating an example of a functional configuration of a production allocation determination processing unit according to the present embodiment.

Next, a functional configuration of the production allocation determination processing unit 100 according to the present embodiment will be described with reference to FIG. 3. FIG. 3 is a diagram illustrating an example of the functional configuration of the production allocation determination processing unit 100 according to the present embodiment.

As illustrated in FIG. 3, the production allocation determination processing unit 100 according to the present embodiment includes a total supply function calculation unit 101, an initial upper and lower limit calculation unit 102, an optimum price calculation unit 103, an allocation calculation unit 104, an upper and lower limit calculation unit 105, and an output unit 106.

The total supply function calculation unit 101 calculates a total supply function model φ from supply function models C'[k] of respective producers k. The total supply function model φ is represented by a relational formula indicating the relationship between the total supply quantity L, the marginal cost λ, the supply upper limits max[k] of the respective producers k, and the supply lower limits min[k] of the respective producers k. Here, the total supply quantity L, the marginal cost λ, the supply upper limits max[k], and the supply lower limits min[k] are variables. Therefore, the total supply function model φ is represented as φ(L, λ, min[1], ..., min[N], max[1], ..., max[N]).

The initial upper and lower limit calculation unit 102 calculates supply upper limits max[k][s] and supply lower limits min[k][s] of the respective producers k at a cross section s=T. At this time, the initial upper and lower limit calculation unit 102 calculates, based on change rate constraints δ[k] of the respective producers k, based on capacity upper limits ul[k] and capacity lower limits ll[k][s] of the respective producers k given in advance, and based on current values P[k][0], the supply upper limits max[k][s] and the supply lower limits min[k][s].

Note that the capacity upper limits ul[k] are the upper limit quantities of the product that the producers k can produce. Similarly, the capacity lower limits ll[k] are the lower limit quantities of the product that the producers k can produce. For example, when the producers are electricity generation facilities, the capacity upper limits corresponds to the maximum electricity generation quantities, and the capacity lower limits corresponds to the minimum electricity generation quantities.

The capacity upper limits ul[k] and the capacity lower limits ll[k] are obtained as the upper limit values and the lower limit values of the supply quantities P[k] in the supply function models C'[k] of the producers k.

The optimum price calculation unit 103 determines, based on the total supply function model φ, based on a demanded quantity predicted value L[s] at the cross section S, based on the supply upper limits max[k][s] at the cross section s, and based on the supply lower limits min[k][s] at the cross section s, an optimum price predicted value λ[s] at the cross section S.

The allocation calculation unit 104 determines, based on the supply function models C'[k] of the respective producers k and the optimum price predicted value λ[s] at the cross section S, optimum supply quantity predicted values P[k][s] of the respective producers k at the cross section s.

The upper and lower limit calculation unit 105 calculates, based on the predicted values P[k][s+1] of supply quantities of the respective producers k at the cross section s+1, the supply upper limits max[k][s] and the supply lower limits min[k][s] of the respective producers k at the cross section s (<T).

At this time, the upper and lower limit calculation unit 105 calculates, based on the change rate constraints δ[k] of the respective producers k, based on the capacity upper limits ul[k] and the capacity lower limits ll[k] of the respective producers k, based on the current values P[k][0], and based on the optimum supply quantity predicted values P[k][s+1] of the respective producers k at the cross section s+1, the supply upper limits max[k][s] and the supply lower limits min[k][s].

The output unit 106 outputs the optimum supply quantity predicted values P[k][s] of the respective producers k (k=1, 2, ..., N) at each of the respective cross sections s (s=1, 2, ..., T). The output destination of the output unit 106 may be, for example, the display device 12, the auxiliary storage device 18, the recording medium 13a, or the like. Further, the output destination of the output unit 106, for example, may be another program, another device (for example, a server device on a network) or the like.

The output unit 106 may send instructions to the respective producers k to cause the respective producers k to physically transfer and supply industrial energy resources, such as electric power, gas, or steam, by the determined optimum supply quantity predicted values P[k][s] of the respective producers k at each of the respective cross sections s.

Note that, in the production allocation determination processing unit 100, the initial upper and lower limit calculation unit 102 and the upper and lower limit calculation unit 105 may be configured as one functional unit, for example.

The production allocation determining apparatus 10 and the plurality of producers, for which optimum allocations are determined, may be included in a single system.

<Determination Process of Production Allocations>

Figure 4:
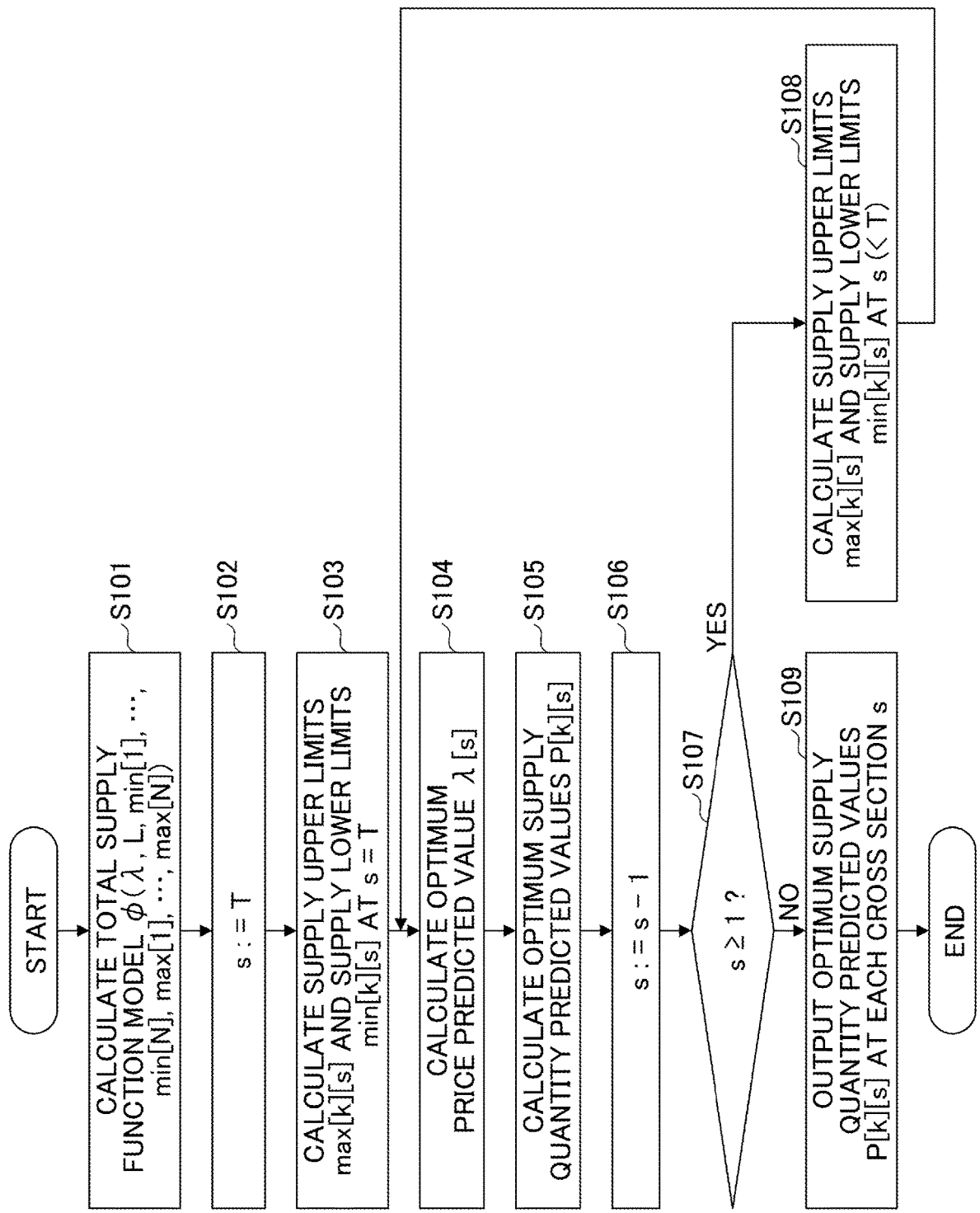
FIG. 4 is a flowchart illustrating an example of a determination process of production allocations.

Next, a determination process of production allocations that is executed by the production allocation determination processing unit 100 according to the present embodiment will be described with reference to FIG. 4. FIG. 4 is a flowchart illustrating an example of the determination process of production allocations. Note that in the following description, it is assumed that demanded quantity predicted values L[s] at respective cross sections s (s=1, 2, ..., T) and current values P[k][0] of production quantities of respective producers k have been input to the production allocation determination processing unit 100.

First, the total supply function calculation unit 101 of the production allocation determination processing unit 100 calculates a total supply function model φ from supply function models C'[k] of respective producers k in step S101.

Using the supply function models C'[k] of the respective producers k, the total supply function calculation unit 101 calculates a total supply quantity L and a marginal cost λ according to the following formula (1).

$$L = \sum_{k=1}^{N} P[k] \qquad \text{formual (1)}$$

$$\lambda = C'[k](P[k], \min[k], \max[k])$$

Here, P[k] is a variable indicating the supply quantities of the producers k. Also, C'[k] (P[k], min[k], max[k]) is a function indicating the marginal cost when the supply quantities of the producers k are P[k], the supply upper limits are max[k], and the supply lower limits are min[k].

By calculating a feasible solution of values taken by the supply upper limits max[k] and the supply limits min[k] of the respective producers k, the lower total supply quantity L, and the marginal cost λ indicated by the above formula (1), the total supply function calculation unit 101 obtains a total supply function model Q (L, λ, min[1], min[N], ... max[1], ..., max[N]). Such a feasible solution can be obtained by, after generating a first-order predicate logic formula by using formulas representing the supply function models C'[k] of the respective producers k, the total supply quantity L and the marginal cost λ indicated in the above formula (1), and logic symbols, using an quantifier elimination method to eliminate quantifiers in the generated first-order predicate logic formula.

Next, the production allocation determination processing unit 100 sets the cross section s such that s=T (that is, the last cross section s=T of the cross sections s=1, 2, ..., T) in step S102.

Next, the initial upper and lower limit calculation unit 102 of the production allocation determination processing unit 100 calculates supply upper limits max[k][s] and supply lower limits min[k][s] of the respective producers k at the cross section s=T in step S103. Note that the details of the process of calculating the supply upper limits max[k][s] and the supply lower limits min[k][s] of the respective producers k at the cross section s=T will be described later below.

Next, the optimum price calculation unit 103 of the production allocation determination processing unit 100 calculates, based on the total supply function model φ, based on a demanded quantity predicted value L[s] at the cross section s, based on the supply upper limits max[k][s] at the cross section s, and based on the supply lower limits min[k][s] at the cross section s, an optimum price predicted value λ[s] at the cross section s in step S104.

By substituting, into the total supply function model q (L, λ, min[1], . . . min[N], max[1], . . . max[N]), the demanded quantity predicted value L[s] at the cross section s, the supply upper limits max[k][s] and the supply lower limits min[k][s] of the respective producers k at the cross section s, the optimum price calculation unit 103 calculates the optimum price predicted value λ[s] at the cross section s. In other words, in the total supply function P (L, λ, min[1][s], . . . min[N][s], max[1][s], max[N][s]) on the λ-L plane, the optimum price calculation unit 103 calculates the marginal cost (optimum price predicted value) λ[s] corresponding to the demanded quantity predicted value L[s] at the cross section s. Thereby, the optimum price predicted value λ[s] at the cross section s is determined.

Next, the allocation calculation unit 104 of the production allocation determination processing unit 100 calculates, based on the supply function models C'[k] of the respective producers k, based on the optimum price predicted value λ[s] at the cross section s, based on the supply upper limits max[k][s], and based on the supply lower limits min[k][s], optimum supply quantity predicted values P[k][s] of the respective producers k at the cross section s in step S105. Thereby, the optimum supply quantity predicted values P[k][s] indicating allocations of optimum supply quantities of the respective producers k at the cross section s are determined. Note that the details of the process of calculating the optimum supply quantity predicted values P[k][s] of the respective producers k at the cross section s will be described later below.

Next, the production allocation determination processing unit 100 sets s=s−1 with respect to the cross section s (that is, the production allocation determination processing unit 100 shifts the cross section s to the past by one) in step S106. In other words, the production allocation determination processing unit 100 may decrement the value of s by one.

Next, the production allocation determination processing unit 100 determines whether the cross section s≥1 in step S107.

When determining that the cross section s≥1 in step S107, the upper and lower limit calculation unit 105 of the production allocation determination processing unit 100 based calculates, on predicted values P[k][s+1] of supply quantities of the respective producers k at the cross section s+1, supply upper limits max[k][s] and supply lower limits min[k][s] of the respective producers k at the cross section s (<T) in step S108. Note that the details of the process of calculating the supply upper limits max[k][s] and the supply lower limits min[k][s] of the respective producers k at the cross section s (<T) will be described later below.

Then, the production allocation determination processing unit 100 returns to the processing in step S104. In this way, the supply upper limits max[k][s] and the supply lower limits min[k][s] of the respective producers k at each of the respective cross sections s from the cross section s=T−1 to the cross section s=1 are repeatedly calculated.

Conversely, when not determining that the cross section s≥1 in step S107 (that is, when s=0), the output unit 106 of the production allocation determination processing unit 100 outputs the optimum supply quantity predicted values P[k][s] of the respective producers k (k=1, 2, . . . , N) at the respective cross sections s (s=1, 2, . . . , T) in step S109. Thereby, with reference to the current time (s=0), the optimum supply quantity predicted values P[k][s] of the respective producers k at each of the respective cross sections s from the cross section s=1 to the cross section s=T are output.

In other words, the output unit 106 may send instructions to the respective producers k to cause the respective producers k to physically transfer and supply industrial energy resources, such as electric power, gas, or steam, by the determined optimum supply quantity predicted values P[k][s] of the respective producers k at each of the respective cross sections s.

As described above, by repeating, in order from the cross section s=T to the cross section s=1, the calculation of the supply upper limits max[k][s] and the supply lower limits min[k][s], the calculation of the optimum price predicted value λ[s], and the calculation of the optimum supply quantity predicted values P[k][s], the production allocation determining apparatus 10 according to the present embodiment can determine optimum production allocations P[k][s] of the respective producers k at each of the respective cross sections s. In addition, the production allocation determining apparatus 10 according to the present embodiment can calculate at a higher speed with a smaller amount of calculation, compared with a method of using quadratic programming, an equal λ method, or the like.

<Calculation Process of Supply Upper Limits and Supply Lower Limits at Cross Section s=T>

Figure 5:
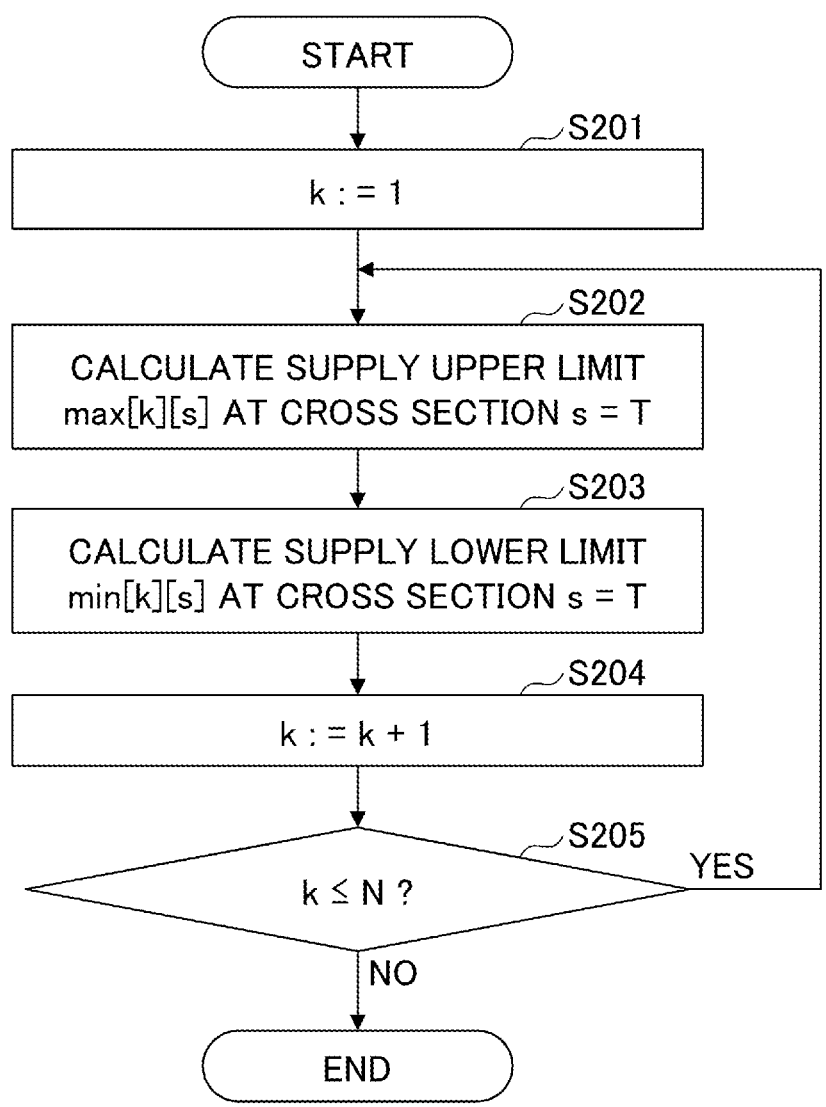
FIG. 5 is a flowchart illustrating an example of a calculation process of the supply upper limits and the supply lower limits at a cross section s=T.

Next, the details of the process of step S103 in FIG. 4 (the process of calculating the supply upper limits and the supply lower limits min[k][s] of the respective producers k at the cross section s=T) will be described with reference to FIG. 5. FIG. 5 is a flowchart illustrating an example of a calculation process of the supply upper limits and the supply lower limits at the cross section s=T.

First, the initial upper and lower limit calculation unit 102 sets k=1 with respect to the producers k in step S201.

Next, the initial upper and lower limit calculation unit 102 calculates, based on the change rate constraint δ[k] of the producer k, based on the capacity upper limit ul[k] of the producer k, and based on the current value P[k][0], the supply upper limit max[k][s] at the cross section s=T in step S202.

Based on max1[k][s]=P[k][0]+s×δ[k], the initial upper and lower limit calculation unit 102 calculates the supply upper limit max[k][s] from max[k][s]=MIN (ul[k], max1[k][s]). That is, the initial upper and lower limit calculation unit 102 sets the smaller one of ul[k] or max1[k][s] as the supply upper limit max[k][s]. In other words, the initial upper and lower limit calculation unit 102 sets, as the supply upper limit max[k][s], the smaller one of the upper limit quantity that can be produced by the producer k (the capacity upper limit ul[k]) and the upper limit quantity that can be produced by the producer k at the cross section s when the supply quantity is changed from the current value P[k][0] in consideration of the change rate constraint δ[k] (max1[k][s]).

Next, the initial upper and lower limit calculation unit 102 calculates, based on the change rate constraint δ[k] of the producer k, based on the capacity lower limit ll[k] of the producer k, and based on the current value P[k][0], the supply lower limit min[k][s] at the cross section s=T in step S203.

Based on min1[k][s]=P[k][0]−s×δ[k], the initial upper and lower limit calculation unit 102 calculates the supply lower limit min[k][s] from min[k][s]=MAX (ll[k], min1[k][s]). That is, the initial upper and lower limit calculation unit 102 sets the larger one of ll[k] or min1[k][s] as the supply lower limit min[k][s]. In other words, the initial upper and lower limit calculation unit 102 sets, as the supply lower limit min[k][s], the larger one of the lower limit quantity that can be produced by the producer k (the capacity lower limit ll[k]) and the lower limit quantity that can be produced by the producer k at the cross section s when the supply quantity is changed from the current value P[k][0] in consideration of the change rate constraint δ[k] (min1[k][s]).

Note that the execution order of the process in steps S203 and S204 may be reversed.

Next, the initial upper and lower limit calculation unit 102 sets k=k+1 with respect to the producers k in step S204. In other words, the initial upper and lower limit calculation unit 102 may increment the value of k by one.

Next, the initial upper and lower limit calculation unit 102 determines whether k≤N in step S205.

When determining that k≤N in step S205, the initial upper and lower limit calculation unit 102 returns the process to step S202. In this way, from the producer k=1 to the producer k=N, the supply upper limits max[k][s] and the supply lower limits min[k][s] of all the producers k at the cross section s=T are repeatedly calculated.

Conversely, when not determining that k≤N in step S205, the initial upper and lower limit calculation unit 102 ends the calculation process of the supply upper limits and the supply lower limits at t the cross section s=T.

Figure 6:
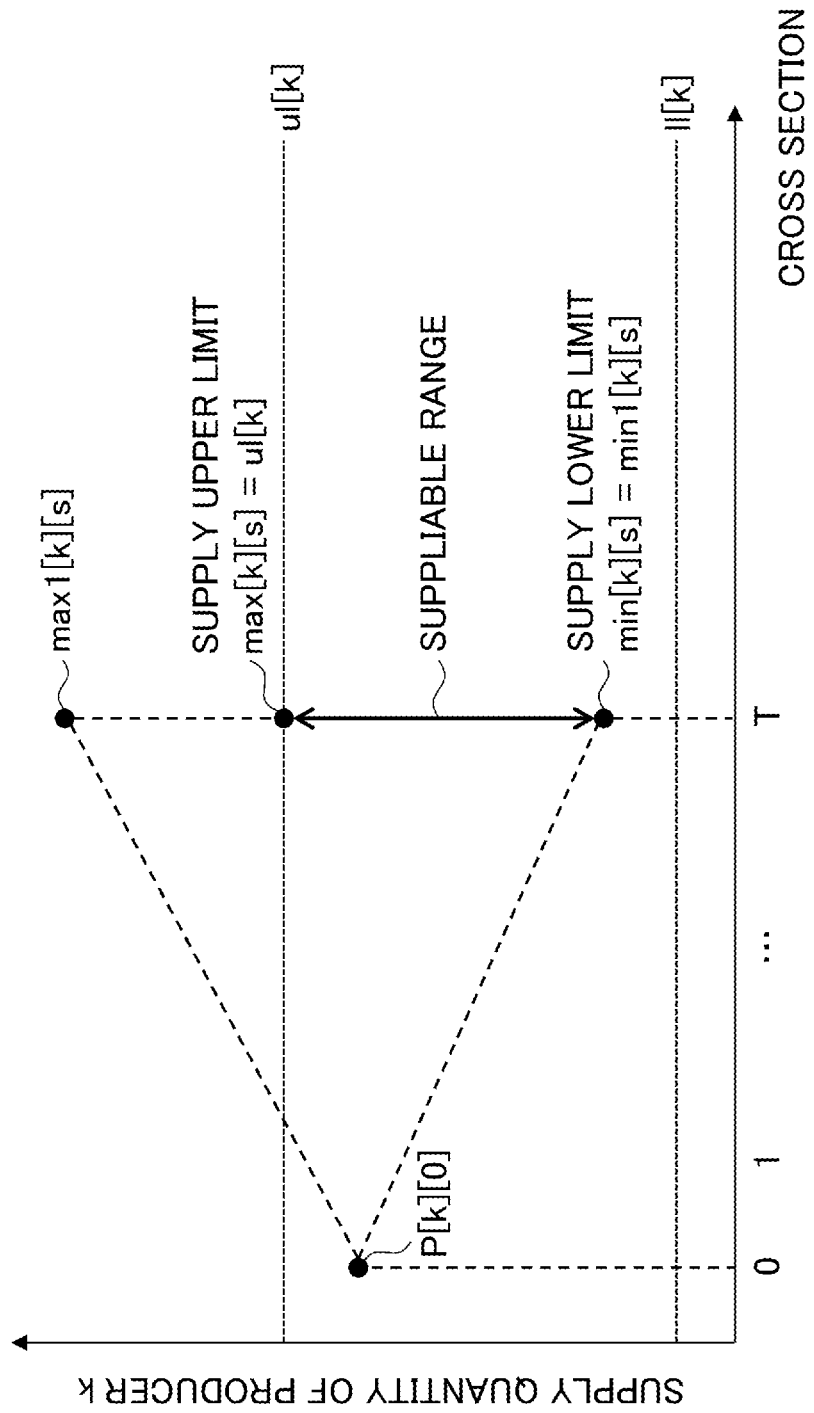
FIG. 6 is a diagram illustrating an example of the suppliable range of a producer k at the cross section s=T.

Here, the suppliable range of the producer k at the cross section s=T is represented by the supply upper limit max[k][s] and the supply lower limit min[k][s]. FIG. 6 illustrates the suppliable range of a producer k. In the example illustrated in FIG. 6, max1[k][s]>ul[k] and min1[k][s]>ll[k]. In this case, the supply upper limit max[k][s]=ul[k] and the supply lower limit min[k][s]=min1[k][s]. In this case, at the cross section s=T, the range of the supply quantity P[k][s] that can be supplied by the producer k (suppliable range) is min[k][s]≤ P[k][s]≤ max[k][s].

<Calculation Process of Optimum Supply Quantity Predicted Values>

Figure 7:
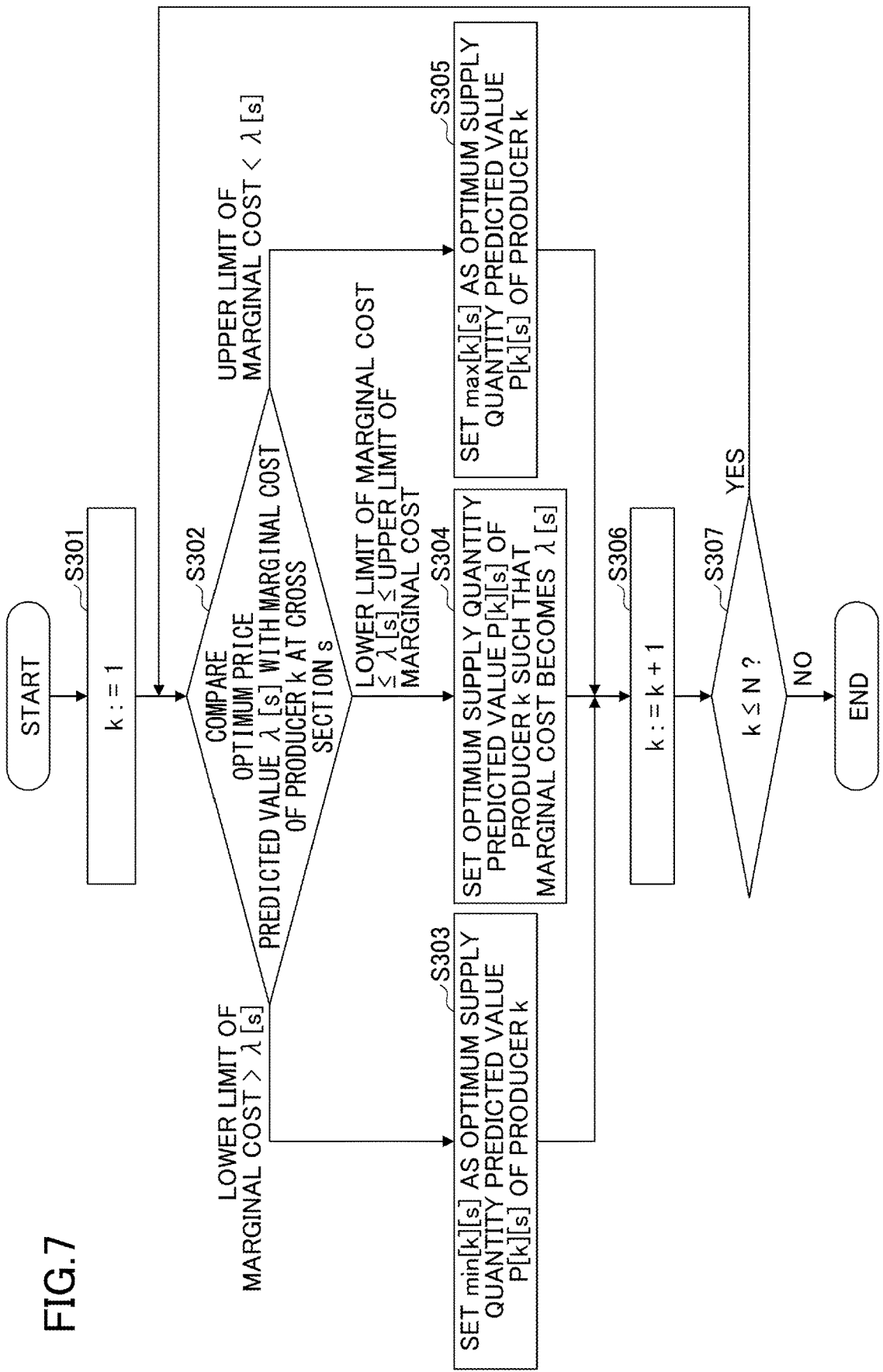
FIG. 7 is a flowchart illustrating an example of a calculation process of optimum supply quantity predicted values.

Next, the details of the process of step S105 in FIG. 4 (the process of calculating the optimum supply quantity predicted values P[k][s] of the respective producers k at the cross section s) will be described with reference to FIG. 7. FIG. 7 is a flowchart illustrating an example of the calculation process of optimum supply quantity predicted values.

First, the initial upper and lower limit calculation unit 102 sets k=1 with respect to the producers k in step S301.

Next, the allocation calculation unit 104 compares the optimum price predicted value λ[s] at the cross section s with the marginal cost of the producer k at the cross section s in step S302.

Here, the marginal cost when the producer k supplies a supply quantity P[k] at the cross section can be represented by C'[k] (P[k], min[k][s], max[k][s]). This represents the relationship between the supply quantity P[k] and the marginal cost when the supply upper limit and the supply lower limit of producer k at the cross section s are respectively max[k][s] and min[k][s]. Therefore, for the sake of convenience, the marginal cost of the producer k at the cross section s is represented as C'[k][s] (P[k])=C'[k] (P[k], min[k][s], max[k][s]). At this time, when the supply quantity is P[k]=min[k][s], the marginal cost of the producer k at the cross section S the lower is limit and is represented by C'[k][s] (min[k][s]). Similarly, when the supply quantity is P[k]=max[k][s], the marginal cost of the producer k at the cross section s is the upper limit and is represented by C'[k][s] (max[k][s]).

Note that when s=T, min[k][s] and max[k][s] are the supply lower limit and the supply upper limit of the producer k at the cross section s=T calculated by the initial upper and lower limit calculation unit 102. Conversely, when s<T, min[k][s] and max[k][s] are the supply lower limit and the supply upper limit of producer k at the cross section s (<T) calculated by upper and lower limit calculation unit 105.

When determining that λ[s]<the lower limit of the marginal cost in step S302, the allocation calculation unit 104 sets the optimum supply quantity predicted value of the producer k at the cross section s as P[k][s]=min[k][s] in step S303. This is because when λ[s]<the lower limit of the marginal cost, the producer k cannot produce and supply a product commensurate with the optimum price predicted value λ[s]. Therefore, in this case, the supply lower limit min[k][s], which is the lower limit of the supply quantity of the producer k at the cross section s, is set as the optimum supply quantity predicted value P[k][s].

When determining that the lower limit of the marginal cost≤λ[s]≤the upper limit of the marginal cost in step S302, the allocation calculation unit 104 sets the optimum supply quantity predicted value of the producer k at the cross section s to P[k][s] such that the marginal cost becomes λ[s] in step S304. That is, the allocation calculation unit 104 sets, as the optimum supply predicted value, P[k][s] satisfying C'[k][s](P[k][s])=λ[s]. In other words, the supply quantity corresponding to the optimum price predicted value is set as the optimum supply quantity predicted value. This is because when the lower limit of the marginal cost≤ λ[s]≤ the upper limit of the marginal cost, the producer k cannot produce and supply a product commensurate with the optimum price predicted value λ[s].

When determining that the upper limit of the marginal cost<λ[s] in step S302, the allocation calculation unit 104 sets the optimum supply quantity predicted value of the producer k at the cross section s as P[k][s]=max[k][s] in step S305. This is because when the upper limit of the marginal cost<λ[s], the producer k cannot produce and supply a product in accordance with the optimum price predicted value λ[s]. Therefore, in case, this the supply upper limit max[k][s], which is the upper limit of the supply quantity of the producer k at the cross section s, is set as the optimum supply quantity predicted value P[k][s].

Subsequent to step S303, step S304 or step S305, the allocation calculation unit 104 sets k=k+1 with respect to the producers k in step S306. In other words, the allocation calculation unit 104 may increment the value of k by one.

Next, the allocation calculation unit 104 determines whether k≤N in step S307.

When determining that k≤N in step S307, the allocation calculation unit 104 returns the process to step S302. In this way, from the producer k=1 to the producer k=N, the optimum supply quantity predicted values P[k][s] of all the producers k at the cross section s are repeatedly calculated.

Conversely, when not determining that k≤N in step S307, the allocation calculation unit 104 ends the calculation process of the optimum supply quantity predicted values.

<Calculation Process of Supply Upper Limits and Supply Lower Limits at Cross Section s (<T)>

Figure 8:
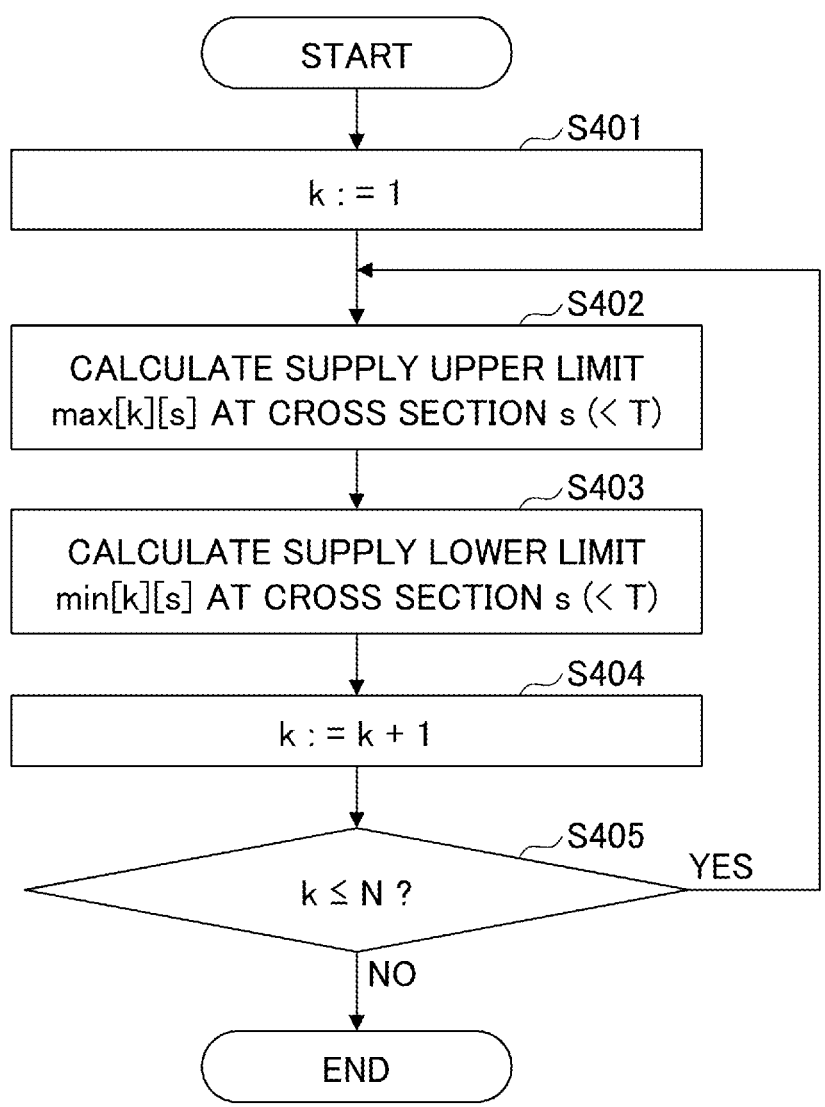
FIG. 8 is a flowchart illustrating an example of a calculation process of the supply upper limits and the supply lower limits at a cross section s (<T)

Next, the details of the process of step S108 in FIG. 4 (the process of calculating the supply upper limits max[k][s] and the supply lower limits min[k][s] of the respective producers k at a cross section s (<T)) will be described with reference to FIG. 8. FIG. 8 is a flowchart illustrating an example of a calculation process of the supply upper limits and the supply lower limits at the cross section s (<T).

The initial upper and lower limit calculation unit 102 sets k=1 with respect to the producers k in step S401.

Next, the upper and lower limit calculation unit 105 calculates, based on the change rate constraint δ[k] of the producer k, based on the capacity upper limit ul[k] of the producer k, based on the current value P[k][0], and based on the optimum supply quantity predicted value P[k][s+1] of the producer k at the cross section s+1, the supply upper limit max[k][s] at the cross section s (<T) in step S402.

Based on max1[k][s]=P[k][0]+s×δ[k] and max2[k][s]=P[k][s+1]+8 [k], the upper and lower limit calculation unit 105 calculates the supply upper limit max[k][s] from max[k][s]=MIN (ul[k], max1[k][s], max2[k][s]). That is, the upper and lower limit calculation unit 105 sets the smallest one of ul[k], max1[k][s], or max2[k][s] as the supply upper limit max[k][s]. In other words, the upper and lower limit calculation unit 105 sets, as the supply upper limit max[k][s], the smallest one of the upper limit quantity that can be produced by the producer k (the capacity upper limit ul[k]), the upper limit quantity that can be produced by the producer k at the cross section s when the supply quantity is changed from the current value P[k][0] in consideration of the change rate constraint δ[k] (max1[k][s]), and the upper limit quantity that can be produced by the producer k at the cross section S when the supply quantity is changed from the optimum supply quantity predicted value current value P[k][s+1] in consideration of the change rate constraint δ[k] (max2[k][s]).

Next, the upper and lower limit calculation unit 105 calculates, based on the change rate constraint δ[k] of the producer k, based on the capacity lower limit ll[k] of the producer k, based on the current value P[k][0], and based on the optimum supply quantity predicted value P[k][s+1] of the producer k at the cross section s+1, the supply lower limit min[k][s] at the cross section s (<T) in step S403.

Based on min1[k][s]=P[k][0]−s×δ[k] and min2[k][s]=P[k][s+1]−δ[k], the upper and lower limit calculation unit 105 calculates the supply lower limit min[k][s] from min[k][s]=MAX (ll[k], min1[k][s], min2[k][s]). That is, the upper and lower limit calculation unit 105 sets the largest one of ll[k], min1[k][s], or min2[k][s] as the supply lower limit min[k][s]. In other words, the upper and lower limit calculation unit 105 sets, as the supply lower limit min[k][s], the largest one of the lower limit quantity that can be produced by the producer k (the capacity lower limit ll[k]), the lower limit quantity that can be produced by the producer k at the cross section s when the supply quantity is changed from the current value P[k][0] in consideration of the change rate constraint δ[k] (min1[k][s]), and the lower limit quantity that can be produced by the producer k at the cross section S when the supply quantity is changed from the optimum supply quantity predicted value current value P[k][s+1] in consideration of the change rate constraint δ[k] (min2[k][s]).

Note that the execution order of the process in steps S403 and S404 may be reversed.

Next, the initial upper and lower limit calculation unit 102 sets k=k+1 with respect to the producers k in step S404. In other words, the initial upper and lower limit calculation unit 102 may increment the value of k by one.

Next, the initial upper and lower limit calculation unit 102 determines whether k≤N in step S405.

When determining that k≤N in step S405, the upper and lower limit calculation unit 105 returns the process to step S402. In this way, from the producer k=1 to the producer k=N, the supply upper limits max[k][s] and the supply lower limits min[k][s] of all the producers k at the cross section s (<T) are repeatedly calculated.

Conversely, when not determining that k≤N in step S405, the upper and lower limit calculation unit 105 ends the calculation process of the supply upper limits and the supply lower limits at the cross section s (<T).

Figure 9:
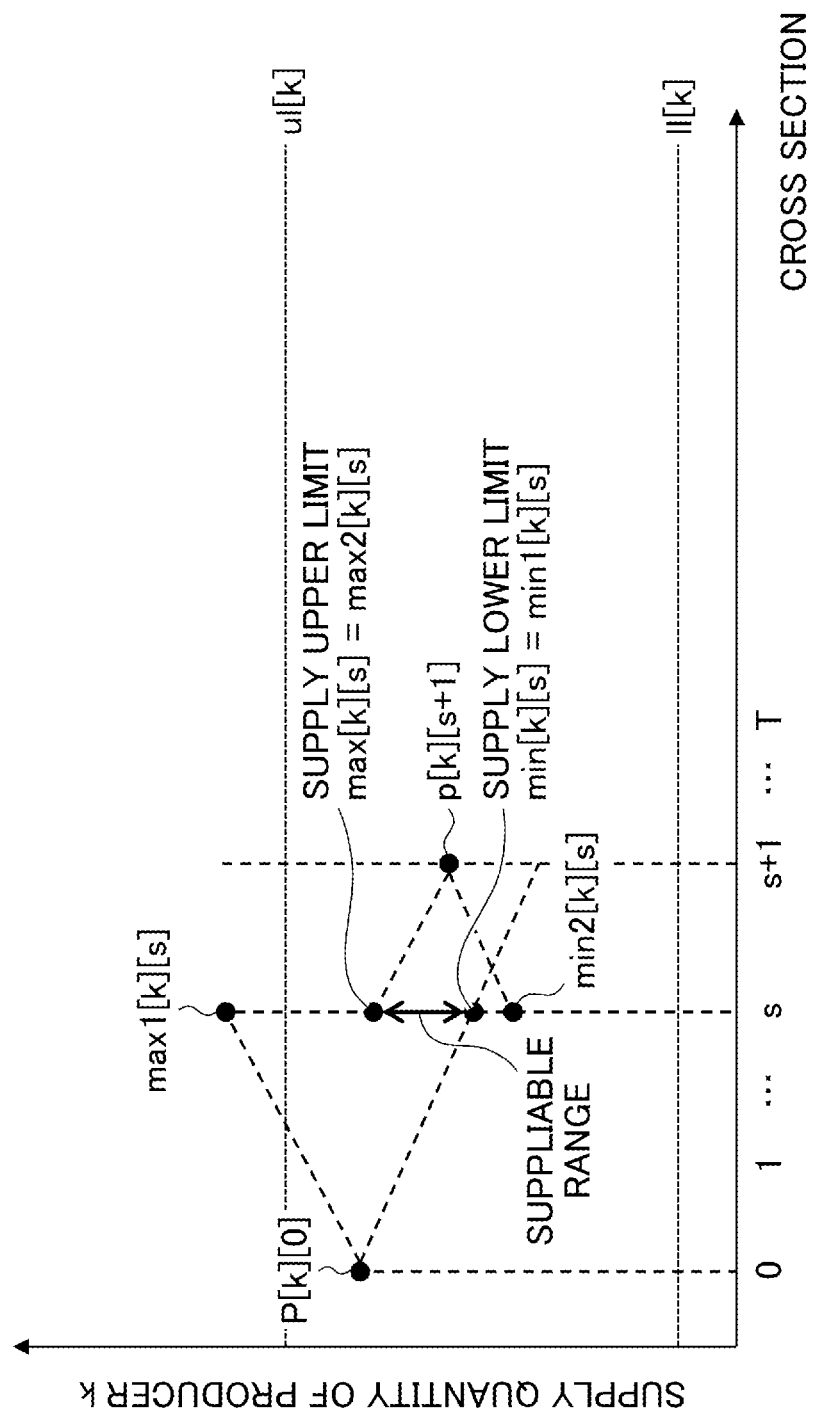
FIG. 9 is a diagram illustrating an example of the suppliable range of a producer k at the cross section s (<T)

Here, the suppliable range of the producer k at the cross section s (<T) is represented by the supply upper limit max[k][s] and the supply lower limit min[k][s]. FIG. 9 illustrates the suppliable range of a producer k. In the example illustrated in FIG. 9, max1[k][s]>ul[k]>max2[k][s] and min1[k][s]>min2[k][s]>ll[k]. In this case, the supply upper limit max[k][s]=max2[k][s] and the supply lower limit min[k][s]=min1[k][s]. In this case, at the cross section s (<T), the range of the supply quantity P[k][s] that can be supplied by the producer k (suppliable range) is min[k][s]≤ P[k][s]≤ max[k][s].

In this way, at a cross section s (<), the production allocation determining apparatus 10 determines the supply upper limits max[k][s] and the supply lower limits min[k][s], in consideration of optimum supply quantity predicted values P[k][s+1] determined at the future cross section s+1. Thus, it is possible to determine the optimum supply upper limits max[k][s] and the optimum supply lower limits min[k][s] at each cross section s (<T).

As described above, according to the production allocation determining apparatus 10 according to the present embodiment, it is possible to determine optimum allocations of the respective producers k at each cross section S in consideration of demanded quantity predictions L[s] a and change rate constraints δ[k]. Further, the production allocation determining apparatus 10 according to the present embodiment determines the optimum allocations without using an iterative algorithm such as a method using an equal λ "method disclosed in Patent Documents 3 to 6 and Non-Patent Documents 1 to 3, for example. Therefore, the production allocation determining apparatus 10 according to the present embodiment can calculate at high speed with a small calculation amount.

Also, a process of determining optimum supply quantities in an optimization method of a conventional technique is in a black box and unclear from outside. Conversely, according to the production allocation determining apparatus 10 according to the present embodiment, how the supply quantities are allocated among the producers is clear based on a relationship between an optimum price predicted value λ[s] and supply function models C'[k]. Thus, a user of the production allocation determining apparatus 10 according to the present embodiment can use the difference between a marginal cost and an optimum price predicted value λ[s] as an index of a degree by which each producer k improves the cost, with respect to optimum supply quantity predicted values P[k][s] obtained as an optimal solution.

Note that the production allocation determining apparatus 10 according to the present embodiment may visualize the process of determining the optimum supply quantity predicted values P[k][s] of the respective producers k by using the total supply function model q and the respective supply function models C'[s][k]. Thereby, a user of the production allocation determining apparatus 10 according to the present embodiment can confirm how the optimum price predicted value λ[s] and the optimum supply quantity predicted values P[k][s] are determined.

Example 1

Figure 10:
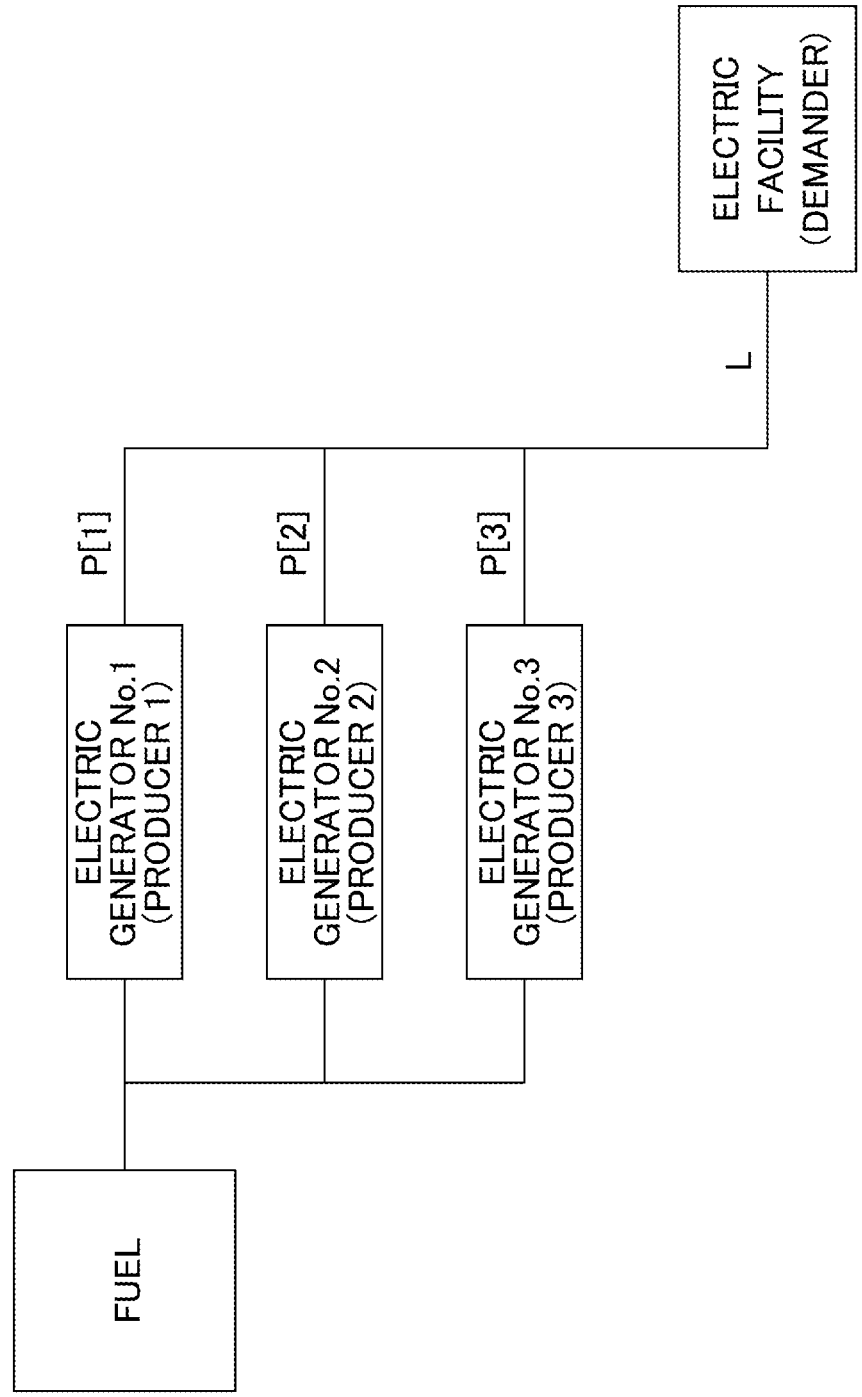
FIG. 10 is a diagram illustrating an example of a demand-and-supply system (Example 1)

In the following, Example 1 of the production allocation determining apparatus 10 according to the present embodiment will be described. In Example 1, optimization of supply quantities in a demand-supply system that is illustrated in FIG. 10 will be described. In the demand-and-supply system illustrated in FIG. 10, three electric generators (which are an electric generator No. 1, an electric generator No. 2, and an electric generator No. 3) use a fuel, respectively generate electric power P[1], P[2], and P[3] (MW), and supply electric power L (MW) to an electric facility. The electric generator No. 1, the electric generator No. 2 and the electric generator No. 3 are producers, and the electric facility is a demander.

The production allocation determining apparatus 10 and the demand-supply system, which includes the electric generators No. 1 to No. 3 to be controlled by the production allocation determining apparatus 10, may be included in a single control system.

In Example 1, T=20, and a time interval between a cross section s+1 and a cross section s is Δs=5 (min).

In Example 1, the capacity upper limit ul[1], the capacity lower limit ll[1], and the change rate constraint δ[1] of the electric generator No. 1 are as follows.

Capability upper limit ul[1]=300 (MW)
Capability lower limit ll[1]=50 (MW)
Change rate constraint δ[1]=20 (MW/5 min)

Similarly, in Example 1, the capacity upper limit ul[2], the capacity lower limit ll[2], and the change rate constraint δ[2] of the electric generator No. 2 are as follows.

Capability upper limit ul[2]=400 (MW)
Capability lower limit ll[2]=100 (MW)
Change rate constraint δ[2]=10 (MW/5 min)

Similarly, in Example 1, the capacity upper limit ul[3], the capacity lower limit ll[3], and the change rate constraint δ[3] of the electric generator No. 3 are as follows.

Capability upper limit ul[3]=500 (MW)
Capability lower limit ll[3]=200 (MW)
Change rate constraint δ[3]=30 (MW/5 min)

Figure 11:
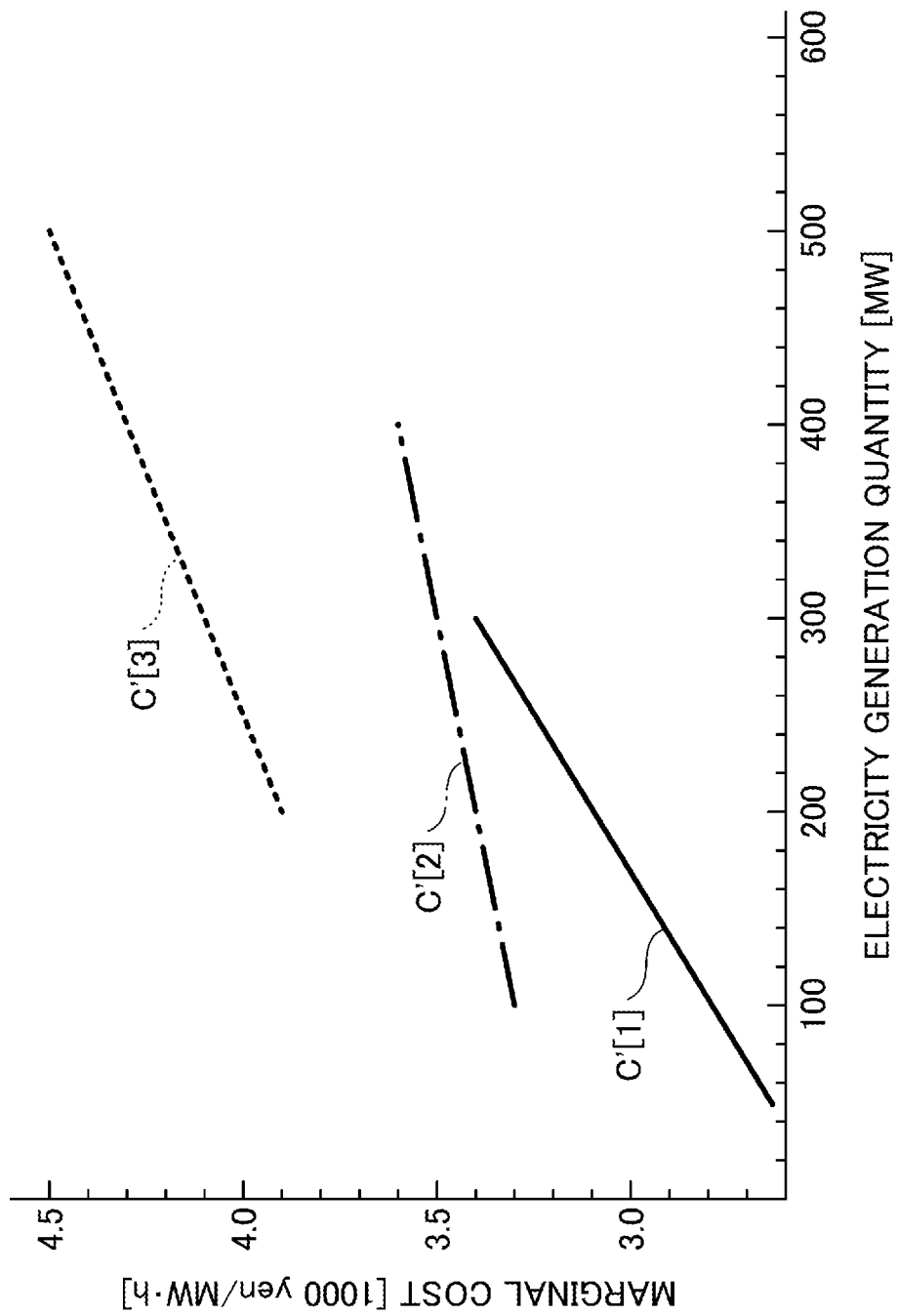
FIG. 11 is a diagram illustrating an example of supply function models of respective electric generators.

Also, FIG. 11 illustrates supply function models C'[k] of the electric generator No. 1, the electric generator No. 2, and the electric generator No. 3. In FIG. 11, C'[1] indicates a supply function model of the electric generator No. 1, C'[2] indicates a supply function model of the electric generator No. 2, and C'[3] indicates a supply function model of the electric generator No. 3.

Figure 12:
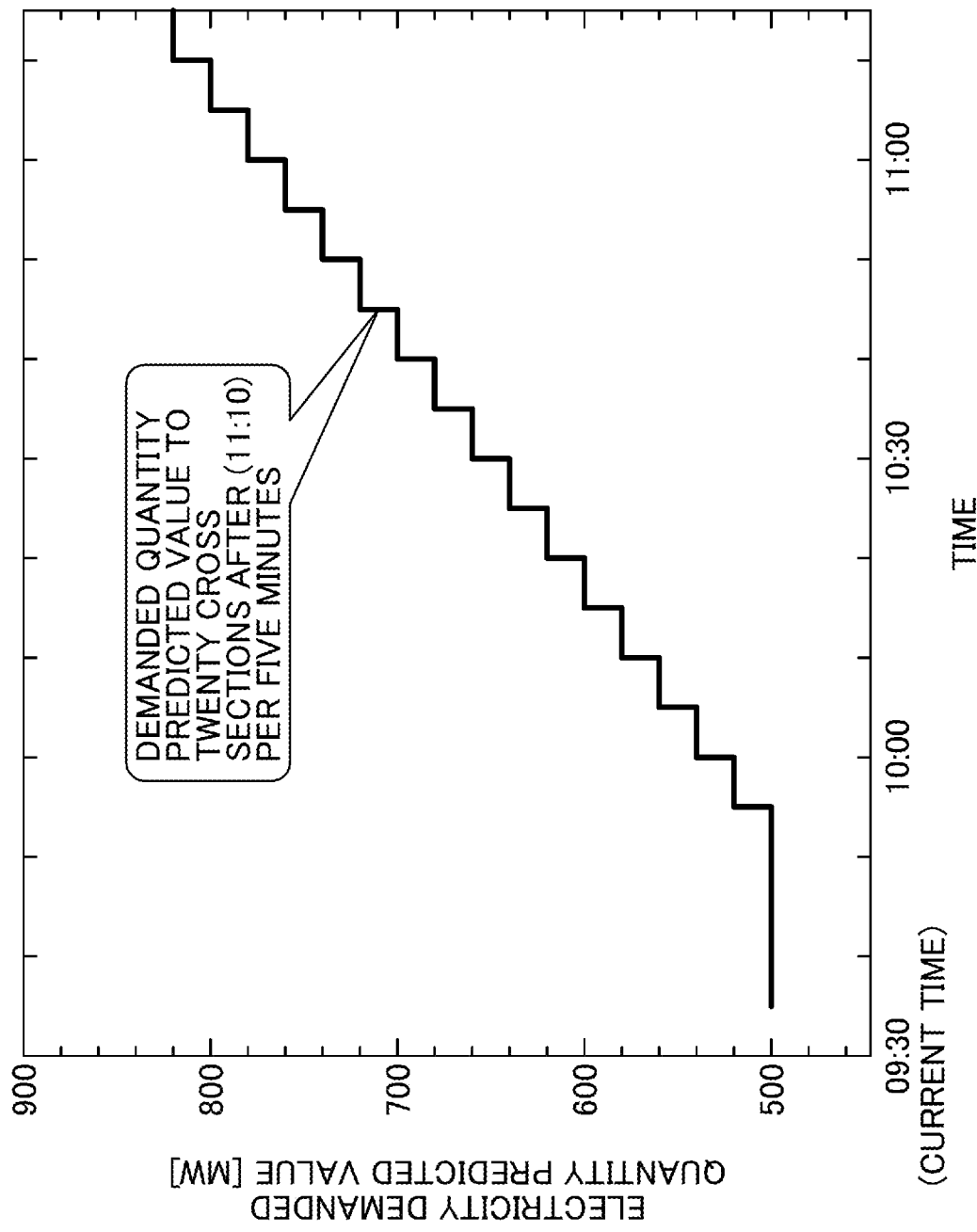
FIG. 12 is a diagram illustrating an example of demanded quantity predicted values.

Also, FIG. 12 illustrates demanded quantity predicted values L[s] (s=1, 2, . . . , 20) input to the production allocation determination processing unit 100. FIG. 12 illustrates the demanded quantity predicted values L[s] from 9:35 (section s=1) to 11:10 (section s=20) assuming the current time as 9:30.

Further, in Example 1, the current value P[1][0] of the electric generator No. 1, the current value P[2][0] of the electric generator No. 2, and the current value P[3][0] of the electric generator No. 3 input to the production allocation determination processing unit 100 are as follows.

Current value P[1][0] of the electric generator No. 1=100 (MW)
Current value P[2][0] of the electric generator No. 2=150 (MW)
Current value P[3][0] of the electric generator No. 3=250 (MW)

That is, the demand-supply system illustrated in FIG. 10 supplies electric power of P[1][0]+P[2][0]+P[3][0]=500 (MW) at the current time 9:30.

Then, in step S101 of FIG. 4 in Example 1, first, the total supply function calculation unit 101 generates mathematical formulas indicated by the following formulas (2).

$$f1:=L=P[1]+P[2]+P[3]$$

$$f2:=f21 \wedge f22 \wedge f23$$

$$f21:=(\min[1] \leq P[1] \leq \max[1] \wedge \lambda = 2*0.0015*P[1]+2.5)V$$
$$(\min[1]=P[1] \wedge \lambda \leq 2*0.0015*\min[1]+2.5)$$
$$V(\max[1]=P[1] \wedge \lambda \geq 2*0.0015*\max[1]+2.5)$$

$$f22:==(\min[2] \leq P[2] \leq \max[2] \wedge \lambda = 2*0.0005*P[2]+3.2)$$
$$V(\min[2]=P[2] \wedge \lambda \leq 2*0.0005*\min[2]+3.2)V(\max[2]=P[2] \wedge \lambda \geq 2*0.0005*\max[2]+3.2)$$

$$f23:=(\min[3] \leq P[3] \leq \max[3] \wedge \lambda = 2*0.0010*P[3]+3.5)V$$
$$(\min[3]=P[3]79\lambda \leq 2*0.0010+\min[3]+3.5)V(\max[3]=P[3] \wedge \lambda \geq 2*0.0010*\max[3]+3.5) \quad \text{formula (2)}$$

Here, f1 is a formula representing that the demanded quantity L of the demander is equal to the total of the electricity generation quantities of the respective electric generators (P[1], P[2], P[3]). Also, f2 is a formula representing the relationship between the supply quantity, the supply lower limit, the supply upper limit, and the marginal cost of each electric generator, and is a formula obtained by coupling f21, f22, and f23 by the logical product (∧).

Here, f21 is, for the electric generator No. 1, a formula obtained by coupling, by the logical disjunction (V), a formula representing a marginal cost when the supply quantity is between the supply upper limit and the supply lower limit, a formula representing a marginal cost when the supply quantity is the supply upper limit, and a formula representing a marginal cost when the supply quantity is the supply lower limit. Similarly, f22 is, for the electric generator No. 2, a formula obtained by coupling, by the logical disjunction (V), a formula representing a marginal cost when the supply quantity is between the supply upper limit and the supply lower limit, a formula representing a marginal cost when the supply quantity is the supply upper limit, and a formula representing a marginal cost when the supply quantity is the supply lower limit. Similarly, f23 is, for the electric generator No. 3, a formula obtained by coupling, by the logical disjunction (V), a formula representing a marginal cost when the supply quantity is between the supply upper limit and the supply lower limit, a formula representing a marginal cost when the supply quantity is the supply upper limit, and a formula representing a marginal cost when the supply quantity is the supply lower limit.

Next, with respect to the logical conjunction of f1 and f2, the total supply function calculation unit 101 gives existential quantifiers (∃) to the electricity generation quantities (P[1], P[2], P[3]) of the respective electric generators to generate a first-order predicate logic formula indicated by the following formula (3).

$$\psi := =\exists P[1] \exists P[2] \exists P[3](f1 \wedge f2) \quad \text{formula(3)}$$

By applying an quantifier elimination method to the bound variables (P[1], P[2] and P[3]) of the first-order predicate formula indicated in the above formula (3), the total supply function calculation unit 101 obtains a total supply function model φ(λ, L, min[1], min[2], min[3], max[1], max[2], max[3]).

Further, in Example 1, in step S103 in FIG. 4, the initial upper and lower limit calculation unit 102 calculates the supply upper limits max[k][s] and the supply lower limits min[k][s] of the respective electric generators at the cross section s=20. For example, for the supply upper limit max[1] of the electric generator No. 1, max1[1]=P[1][0]+S×δ[1]=100+20×20=500 (MW). Therefore, max[1]=MIN (ul[1], max1[1][20])=MIN (300, 500)=300 (MW). Similarly, for example, for the supply lower limit min[1] of the electric generator No. 1, min1[1]=P[1][0]−s×>[1]=100−20×20=−300 (MW). Therefore, min[1]=MAX (ll[1], min1[1])=MAX (50, −300)=50 (MW). Similar calculations can be performed for the electric generator No. 2 and the electric generator No. 3. Thereby, min[1]=50, max[1]=300, min[2]=100, max[2]=350, min[3]=200, and max[3]=500 are obtained.

Also, when s=20, in step S104 of FIG. 4 in Example 1, the optimum price calculation unit 103 calculates an optimum price predicted value λ[s] at the cross section s=20.

Figure 13:
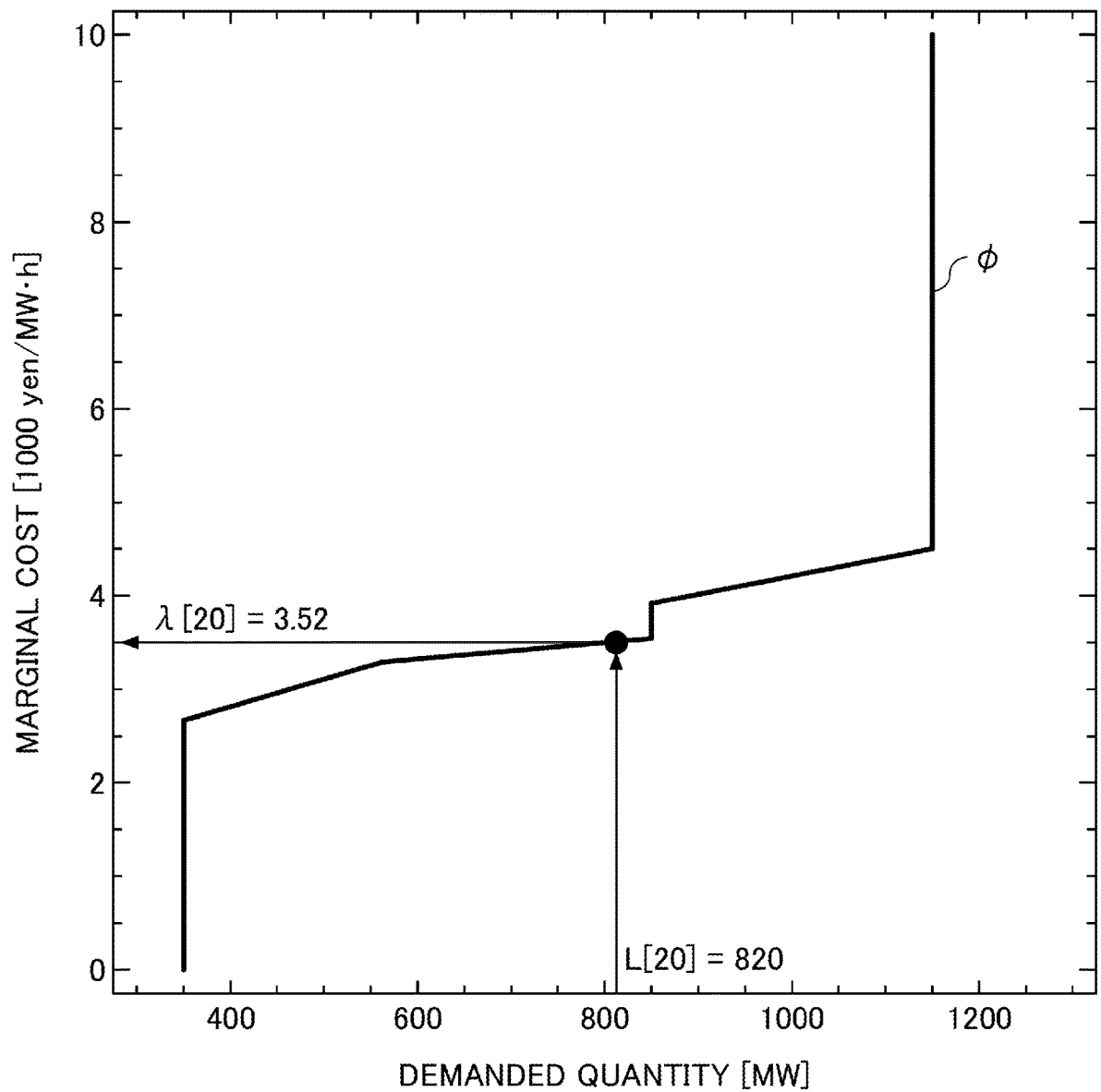
FIG. 13 is a diagram illustrating an example of a total supply function model at a cross section s=20 (Example 1)

First, by substituting, into the total supply function model φ, the supply upper limits max[k] and the supply lower limits min[k] of the respective electric generators at the cross section s=20, the optimum price calculation unit 103 obtains the total supply function φ(λ, L, min[1][20], min[2][20], min[3][20], max[1][20], max[2][20], max[3]) on the Δ-L plane. Then, as illustrated in FIG. 13, in this total supply function (λ, L, min[1][20], min[2], min[3][20], max[1][20], max[2][20], max[3]), the optimum price calculation unit 103 sets the marginal cost λ corresponding to L[20] as the optimum price predicted value λ[20]. In the example illustrated in FIG. 13, the optimum price predicted value λ[20]=3.52 corresponding to L[20]=820 is obtained.

Also, when s=20, in step S105 of FIG. 4 in Example 1, the allocation calculation unit 104 calculates the optimum supply quantity predicted values P[k] of the respective electric generators at the cross section s=20.

Figure 14:
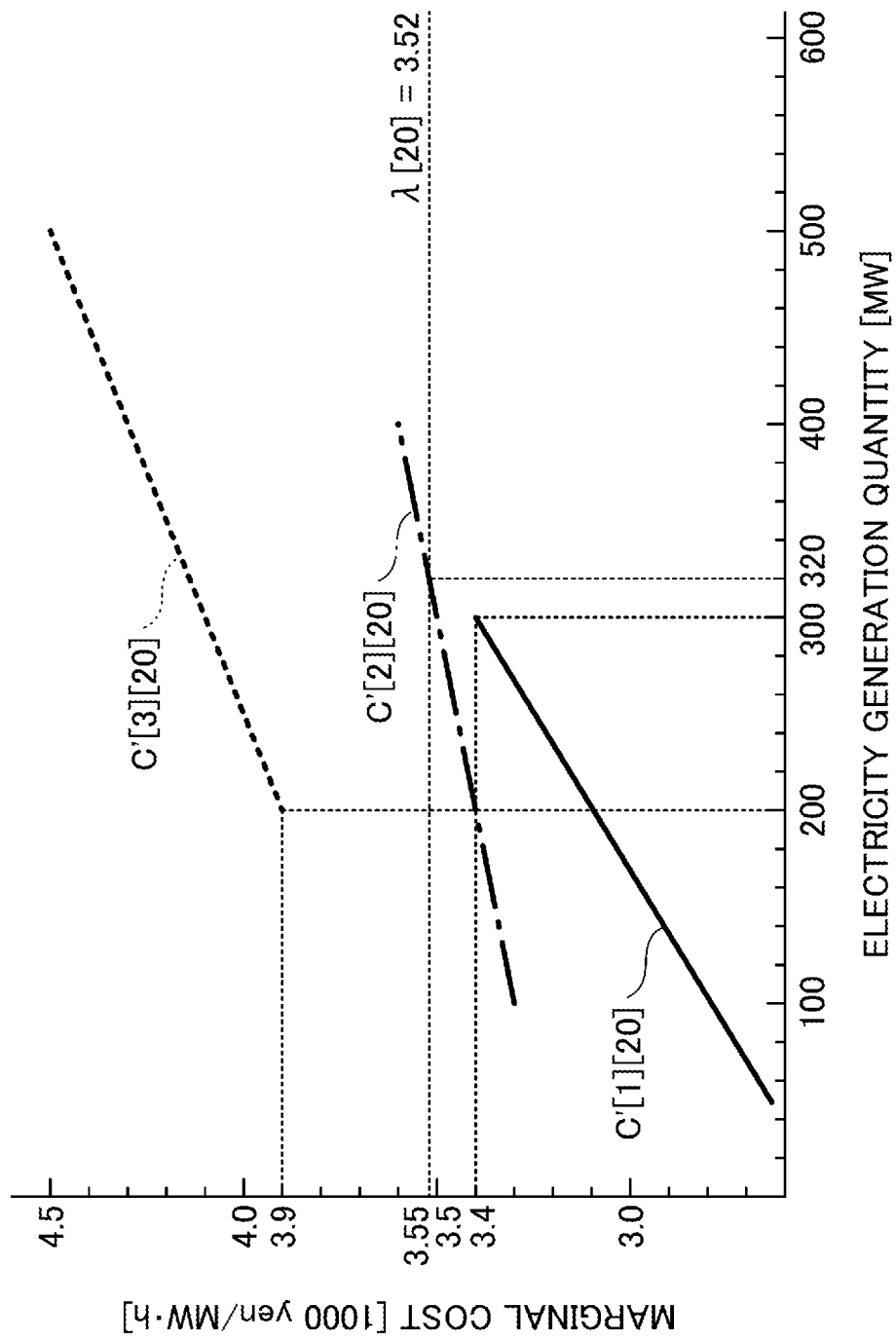
FIG. 14 is a diagram illustrating an example of a case for determining optimum supply quantity predicted values of the respective electric generators at the cross section s=20 (Example 1)

FIG. 14 illustrates the supply function models C'[k] of the respective electric generators at the cross section s=20. As illustrated in FIG. 14, because C'[1] (max[1])<λ[20], the allocation calculation unit 104 sets the optimum supply quantity predicted value of the electric generator No. 1 at the cross section s=20 as P[1]=max[1]=300 (MW). Also, as illustrated in FIG. 14, because C'[2] (min[2][20])≤λ≤C'[2][20] (max[2][20]), the allocation calculation unit 104 sets the optimum supply quantity predicted value P[2] of the electric generator No. 2 at the cross section s=20 such that λ[20]=C'[2] (P[2][20])=3.52 is satisfied. Specifically, by an inverse function of λ[20]=C'[2][20](P[2][20]), (3.52−3.2)/(2×0.0005)=320 (MW) is obtained. Also, as illustrated in FIG. 14, because λ[20]<C'[3] (min[3][20]), the allocation calculation unit 104 sets the optimum supply quantity predicted value of the electric generator No. 3 at the cross section s=20 as P[3]=min[3]=200 (MW).

Thereby, the optimum supply quantity predicted values P[k] of the respective electric generators at the cross section s=20 are determined.

Figure 15:
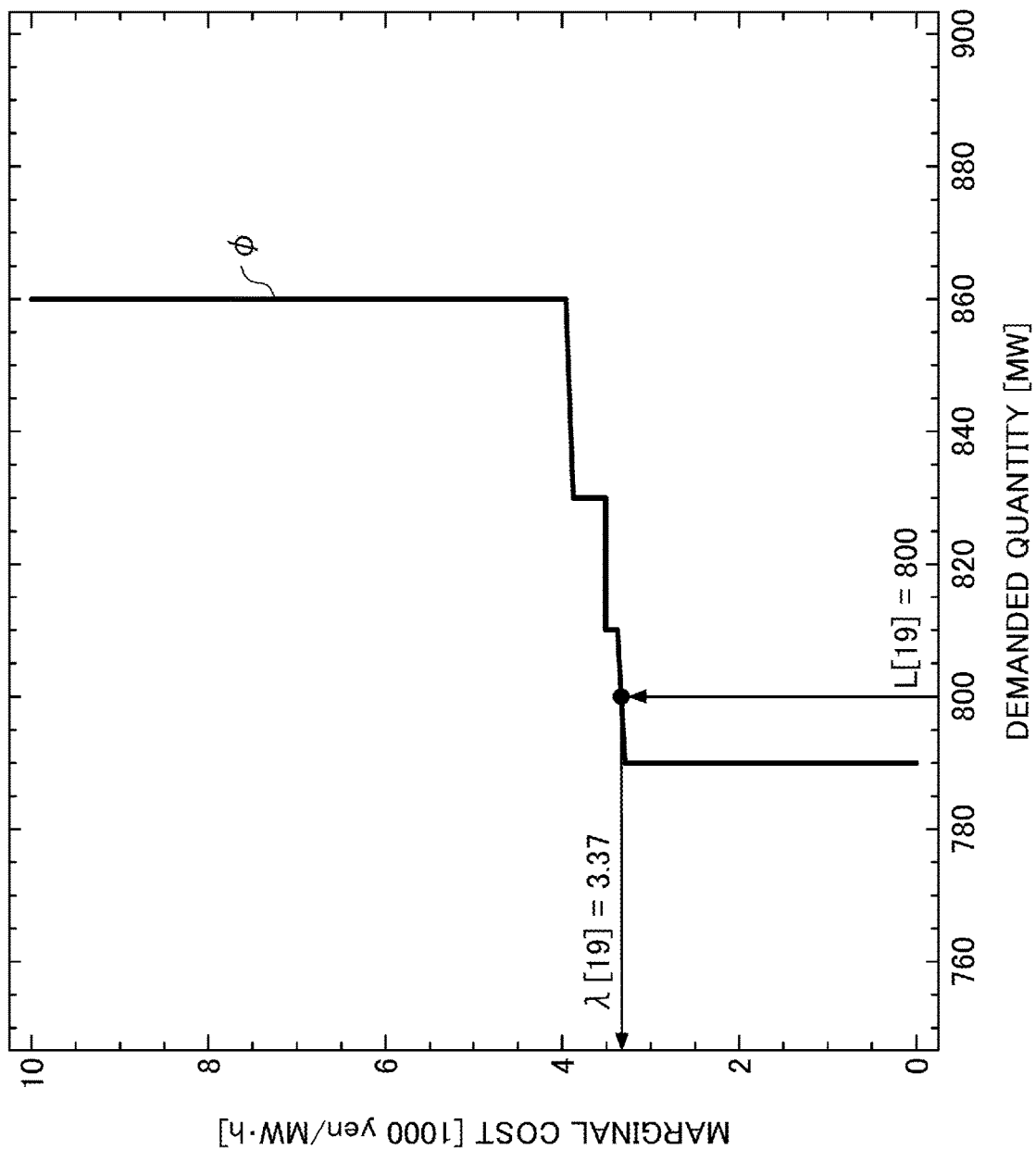
FIG. 15 is a diagram illustrating an example of a total supply function model at a cross section s=19.

Also, when s=19, in step S104 of FIG. 4 in Example 1, the optimum price calculation unit 103 calculates an optimum price predicted value λ[s] at the FIG. 15 illustrates the total cross section s=19, supply function φ(λ, L, min[1][19], min[2][19], max[2][19], max[3]) on the min[3][19], max[1][19], λ-L plane. As illustrated in FIG. 15, in this total supply function φ(λ, L, min[1][19], min[2][19], min[3][19], max [1], max[2][19], max[3]), the optimum price calculation unit 103 sets the limit cost A corresponding to L[19] as the optimum price predicted value λ[19]. In the example illustrated in FIG. 15, the optimum price predicted value λ[19]=3.37 corresponding to L[19]=800 is obtained.

Figure 16:
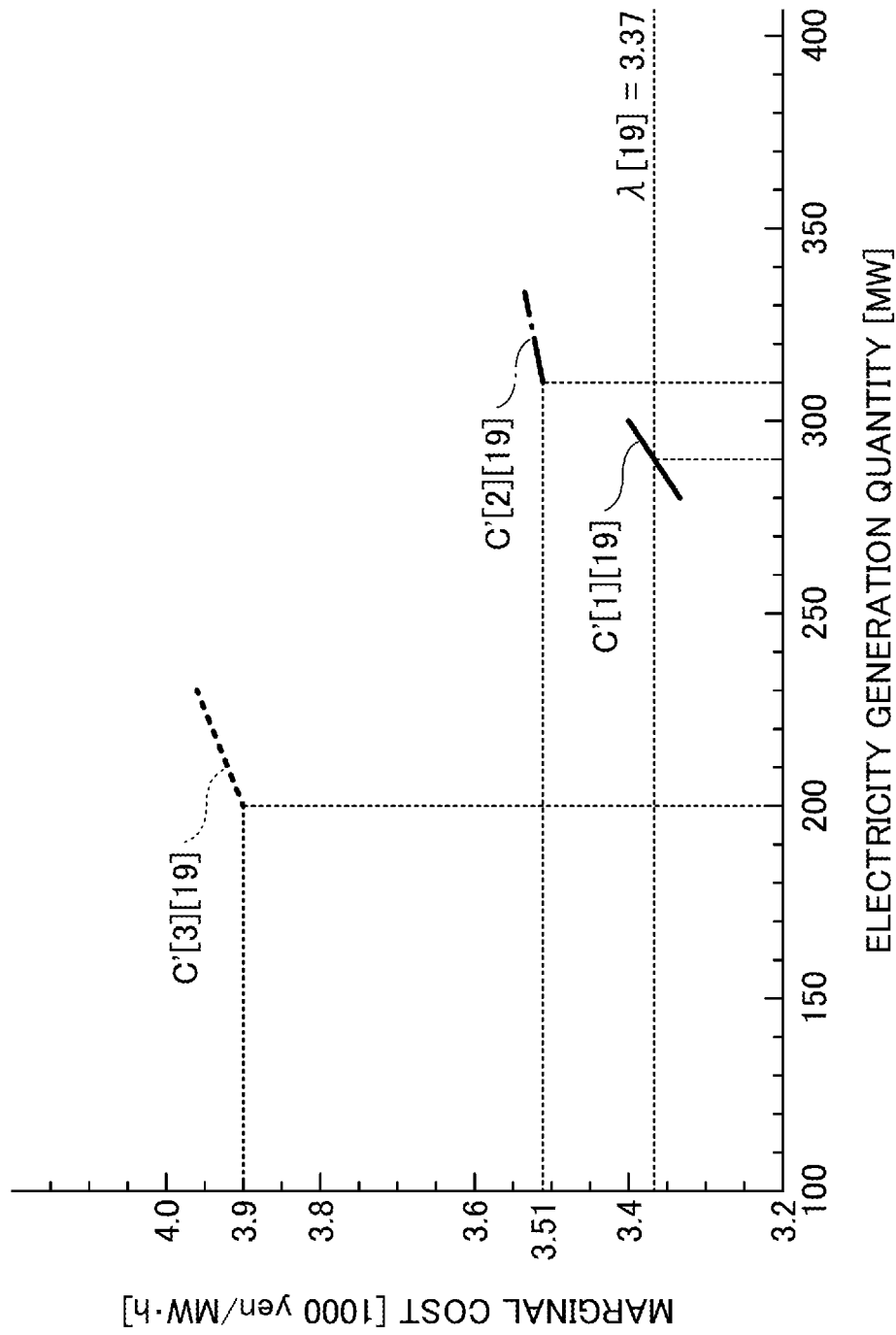
FIG. 16 is a diagram illustrating an example case for determining optimum supply quantity of a predicted values of the respective electric generators at the cross section s=19 (Example 1)

Also, when s=19, in step S105 of FIG. 4 in Example 1, the allocation calculation unit 104 calculates the optimum supply quantity predicted values P[k] of the respective electric generators at the cross section s=19. FIG. 16 illustrates the supply function models C'[k] of the respective electric generators at the cross section s=19. Also, as illustrated in FIG. 16, because C'[1] (min[1][19])≤λ[19]≤C'[1] (max[1]), the allocation calculation unit 104 sets the optimum supply quantity predicted value P[1] of the electric generator No. 1 at the cross section s=19 such that λ[19]=3.37 is Specifically, by an inverse function of satisfied. λ[19]=C'[1] (P[1] [19]), (3.37−2.5)/(2×0.0015)=290 (MW) is obtained. Similarly, because λ[19]<C'[2] (min[2]), the allocation calculation unit 104 sets the optimum supply quantity predicted value of the electric generator No. 2 at the cross section s=19 as P[2]=min[2]=310 (MW). Similarly, because λ[19]<C'[3] (min[3]), the allocation calculation unit 104 sets the optimum supply quantity predicted value of the electric generator No. 3 at the cross section s=19 as P[3]=min[3]=200 (MW).

Subsequently, the optimum supply quantity predicted values P[k][s] of the respective electric generators at each cross section S are similarly determined while shifting from the cross section s=18 to the cross section s=1 towards the past one by one.

Then, the output unit 106 may output may send instructions to the respective electric generators to cause the respective electric generators to physically transfer and supply electricity by the determined optimum supply quantity predicted values P[k][s].

Figure 17:
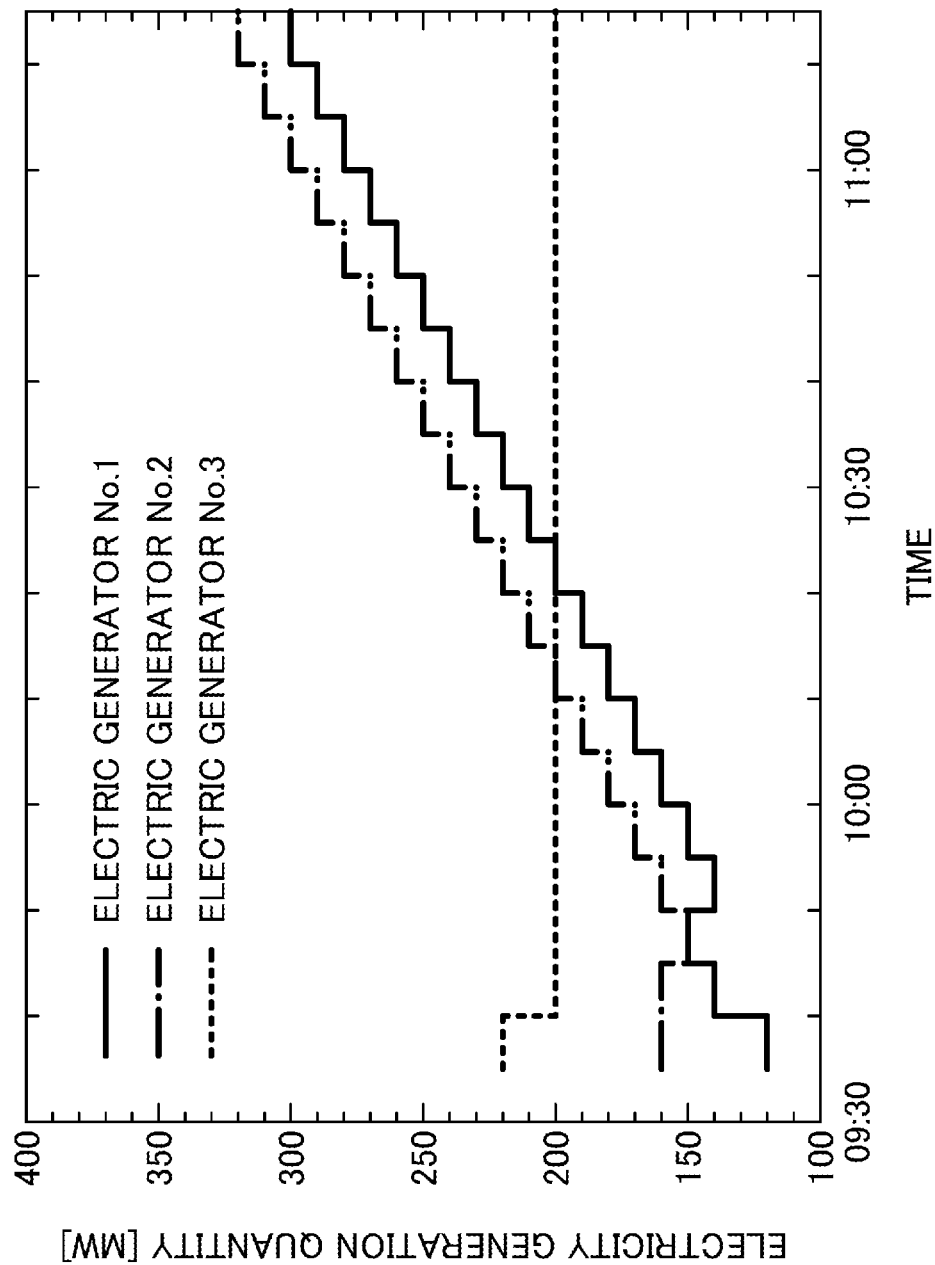
FIG. 17 is a diagram illustrating an example of the optimum supply quantity predicted values of the respective electric generators (Example 1)
Figure 18:
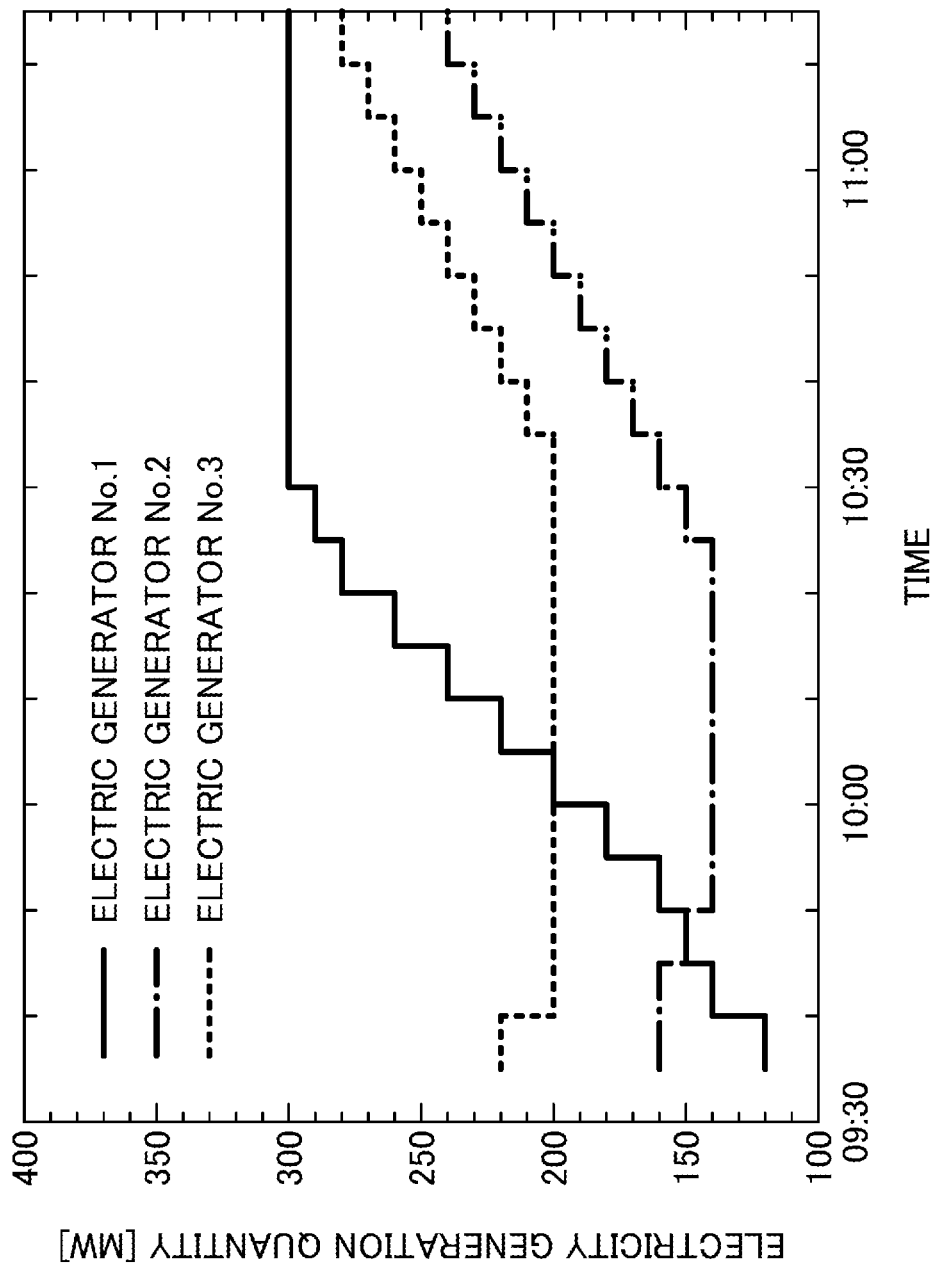
FIG. 18 is a diagram illustrating an example of the optimum supply quantity predicted values of the respective electric generators according to a conventional technique.

Here, for the respective electric generators at each of the respective cross sections s (s=1, 2, ..., 20) in Example 1, FIG. 17 illustrates a result of the optimum supply quantity predicted values P[k][s] determined by the production allocation determining apparatus 10 according to the present embodiment. The example illustrated in FIG. 17 illustrates the electricity generation quantities of the respective electric generators at the cross section s=1 (time 9:35), the cross section s=2 (time 9:40), ..., the cross section s=20 (time 11:10). Conversely, FIG. 18 illustrates a result obtained by using a technique disclosed in Patent Document 2 to calculate the optimum supply quantities of the respective electric generators for each cross section at each time without considering future predictions. Similar to FIG. 17, the example illustrated in FIG. 18 illustrates the electricity generation quantities of the respective electric generators at the cross section s=1 (time 9:35), the cross section s=2 (time 9:40), ..., the cross section s=20 (time 11:10).

It can be found from the comparison of FIG. 17 with FIG. 18 that the allocations for the electric generator No. 1 and the electric generator No. 2 are substantially simultaneously increased in order to keep the allocation for the inefficient electric generator No. 3 small in FIG. 17. Conversely, in FIG. 18, because the operation is performed such that the allocation for the most efficient electric generator No. 1 is increased as much as possible, the electricity generation quantity of the electric generator No. 1 has reached the upper limit at time 10:30 onwards. Therefore, due to the change rate constraints, the allocation needs to be increased not only for the electric generator No. 2 but also for the electric generator No. 3. As a result, the operation illustrated in FIG. 18 is inefficient.

Figure 19:
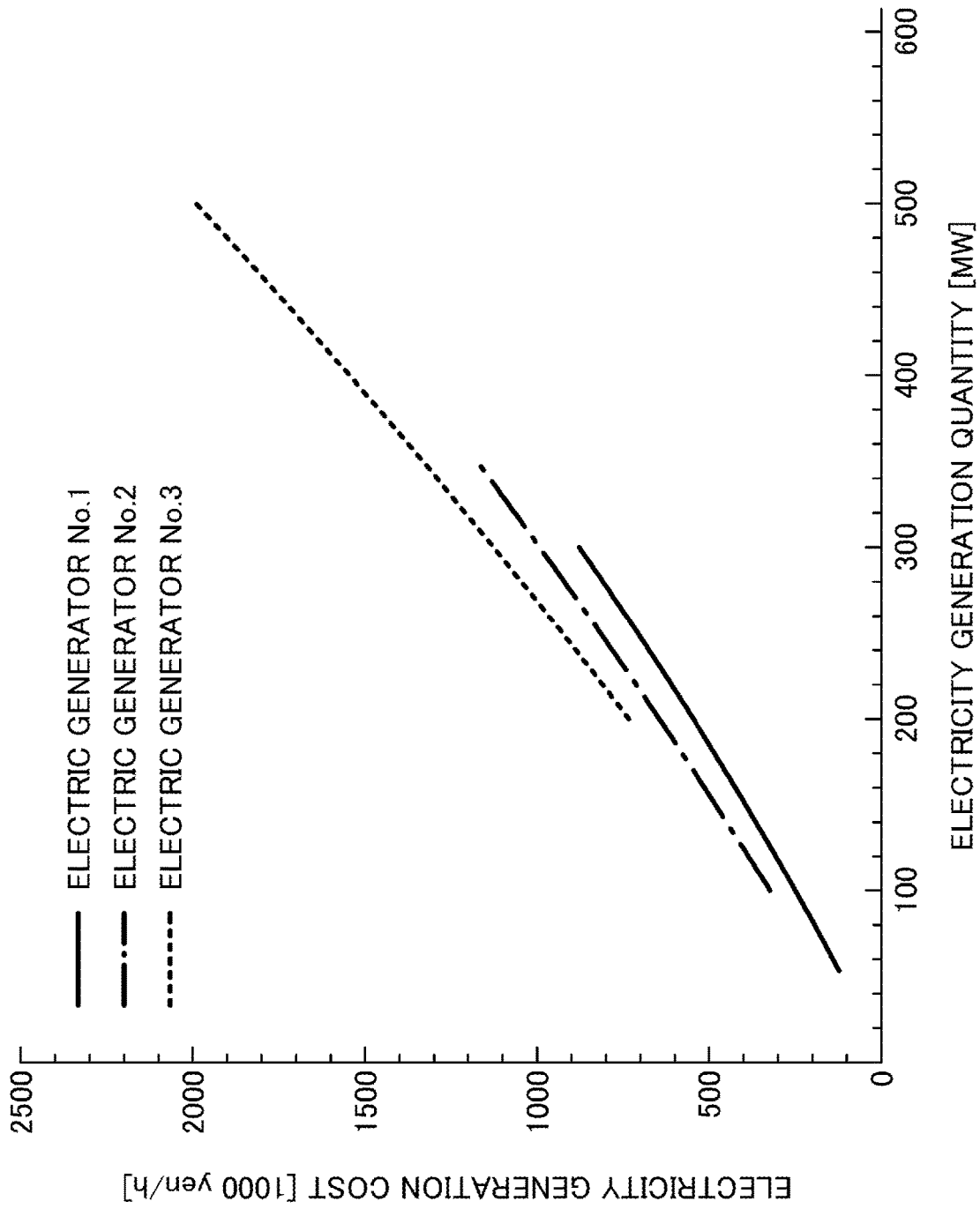
FIG. 19 is a diagram illustrating an example of electricity generation costs of the respective electric generators (Example 1)

Also, FIG. 19 illustrates the electricity generation costs with respect to the electricity generation quantities of the respective electric generators corresponding to the supply function models in FIG. 11. Using the electricity generation costs illustrated in FIG. 19, when the electricity generation costs from the cross section s=1 to the cross section s=20 are calculated, the cost is 3706.32 (1000 yen) in the example illustrated in FIG. 17, and the cost is 3750.57 (1000 yen) in the example illustrated in FIG. 18.

As described above, according to the production allocation determining apparatus 10 according to the present embodiment, by determining the optimum allocations in consideration of predictions of a demanded quantity and change rate constraints of producers, it is possible to operate a demand-supply system at the optimum cost.

Example 2

In the following, Example 2 of the production allocation determining apparatus 10 according to the present embodiment will be described. In Example 2, the production allocation determining apparatus 10 uses (sets) time t as an index representing a time section per unit time (for example, per control cycle). Then, at each time t, the production allocation determining apparatus 10 repeats a process of calculating, with reference to the time t, optimum supply quantity predicted values $P_t[k][s]$ of respective producers k at each cross section s (s=1, 2, . . . , T) and using the values $P_t[k][s]$ as allocations for the respective producers k at the time t+1.

More specifically, using the time t as an index indicating a current time, the production allocation determining apparatus 10 calculates, with reference to the time t=0 (time 9:30, for example), optimum supply quantity predicted values $P_{t=0}[k][s]$ of the respective producers k at each cross section s (s=1, 2, . . . , T) and uses the values $P_{t=0}[k][s]$ as allocations at the time t=1 (time 9:35, for example) for the respective producers k. Next, the production allocation determining apparatus 10 calculates, with reference to the time t=1 (time 9:35, for example), the optimum supply quantity predicted values $P_{t=1}[k][s]$ of the respective producers k at each cross section s (s=2, 3, . . . , T+1) and uses the values $P_{t=1}[k][s]$ as allocations at the time t=2 (time 9:40, for example) for the respective producers k. Next, the production allocation determining apparatus 10 calculates, with reference to the time t=2 (time 9:40, for example), the optimum supply quantity predicted values $P_{t=2}[k][s]$ of the respective producers k at each cross section s (s=3, 4, . . . , T+2) and uses the values $P_{t=2}[k][s]$ as allocations at the time t=3 (time 9:45, for example) for the respective producers k. Subsequently, the production allocation determining apparatus 10 similarly and repeatedly calculates, at each time t, optimum supply quantity predicted values $P_t[k][s]$ of the respective producers k at each cross section s and uses the values $P_t[k][s]$ as allocations at the time t+1 for the respective producers k.

Figure 20:
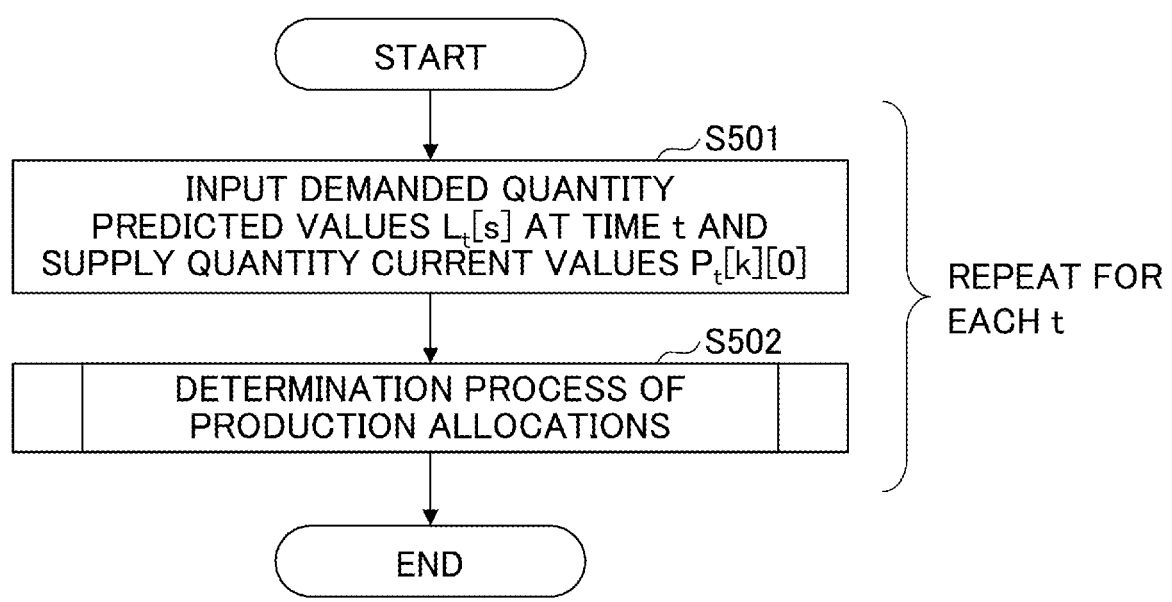
FIG. 20 is a flowchart illustrating an example of determining production allocations repeatedly at each time t (Example 2)

In the following, a process of repeatedly determining, at each time t, optimum supply quantity predicted values $P_t[k][s]$ of the respective producers k at each cross section s will be described with reference to FIG. 20. FIG. 20 is a flowchart illustrating an example of determining production allocations repeatedly at each time t (Example 2). Steps S501 and S502 are repeatedly executed at each time t.

The production allocation determination processing unit 100 inputs demanded quantity predicted values Lt[s] at a time t and current values $P_t[k][0]$ of supply quantity in step S501.

Next, the production allocation determination processing unit 100 executes the determination process of production allocations described with reference to FIG. 4 with the time t as the current time in step S502. Note that, for example, while the supply function models C'[k] of the respective producers k are not changed, the calculation of the total supply function model φ in step S101 is executed only at the first time (for example, only when t=0) and is not required to be executed at the second or subsequent time. Therefore, for example, the calculation of the total supply function model φ in step S101 may be executed offline, and when the determination process of production allocations in FIG. 4 is executed online, the process of step S101 is not required to be executed.

Figure 21:
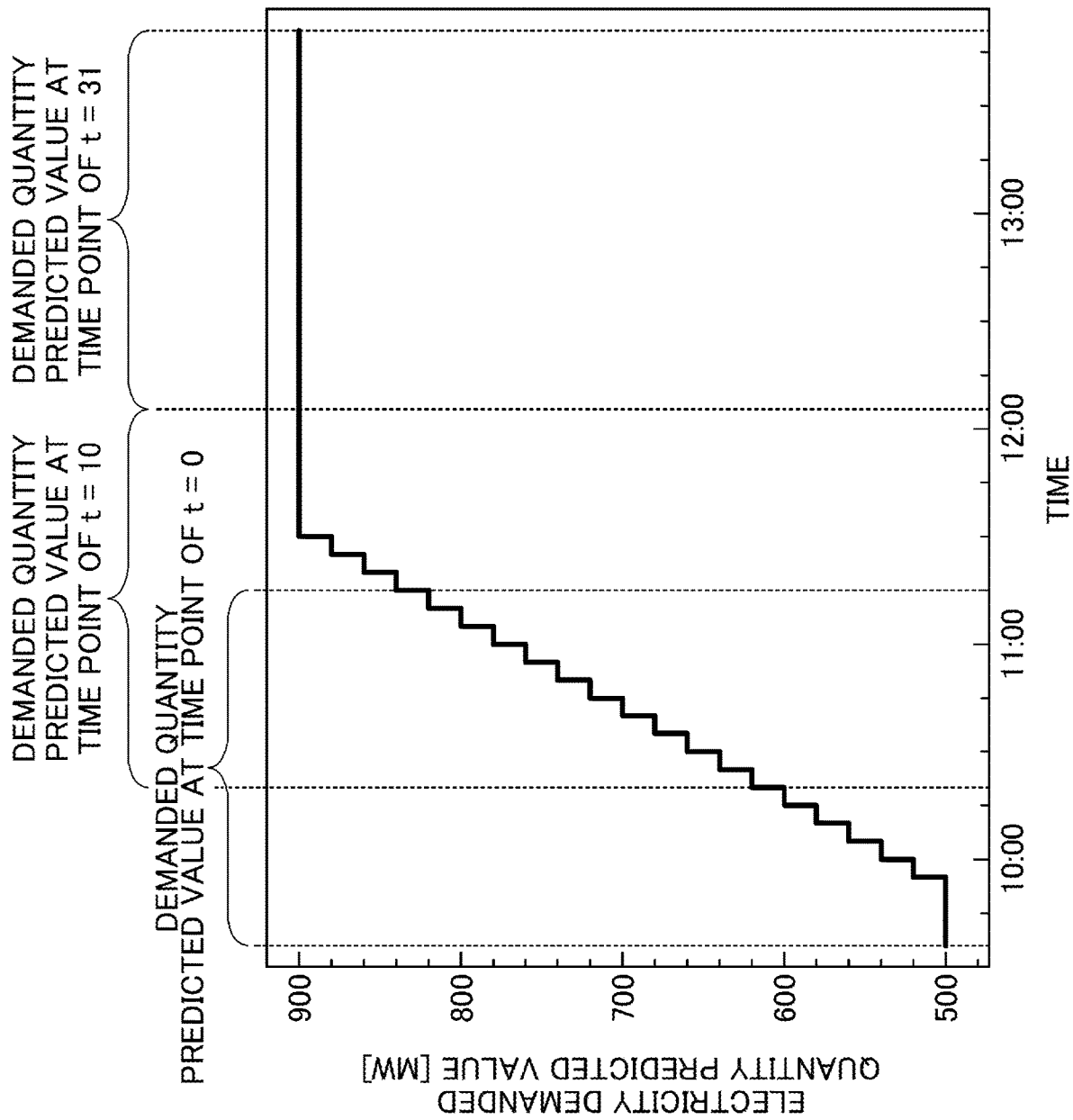
FIG. 21 is a diagram illustrating an example of the demanded quantity predicted values at each time t (Example 2)

Here, FIG. 21 illustrates an example of the demanded quantity predicted values Lt[s] input in step S501 of FIG. 20. As illustrated in FIG. 21, for example, when the time t=0 (time 9:30), the demanded quantity predicted values from the time t=1 (time 9:35) to the time t=20 (time 11:10) are input, as the demanded quantity predicted values $L_{t=0}[s]$ (s=1, 2, . . . , 20), to the production allocation determination processing unit 100. Similarly, for example, when the time t=10 (time 10:20), the demanded quantity predicted values from the time t=11 (time 10:25) to the time t=31 (time 12:05) are input, as the demanded quantity predicted values $L_{t=10}[s]$ (s=1, 2, . . . , 20), to the production allocation determination processing unit 100. Similarly, for example, when the time t=31 (time 12:05), the demanded quantity predicted values from the time t=32 (time 12:10) to the time t=51 (time 13:55) are input, as the demanded quantity predicted values $L_{t=31}[s]$ (s=1, 2, . . . , 20), to the production allocation determination processing unit 100.

Figure 22:
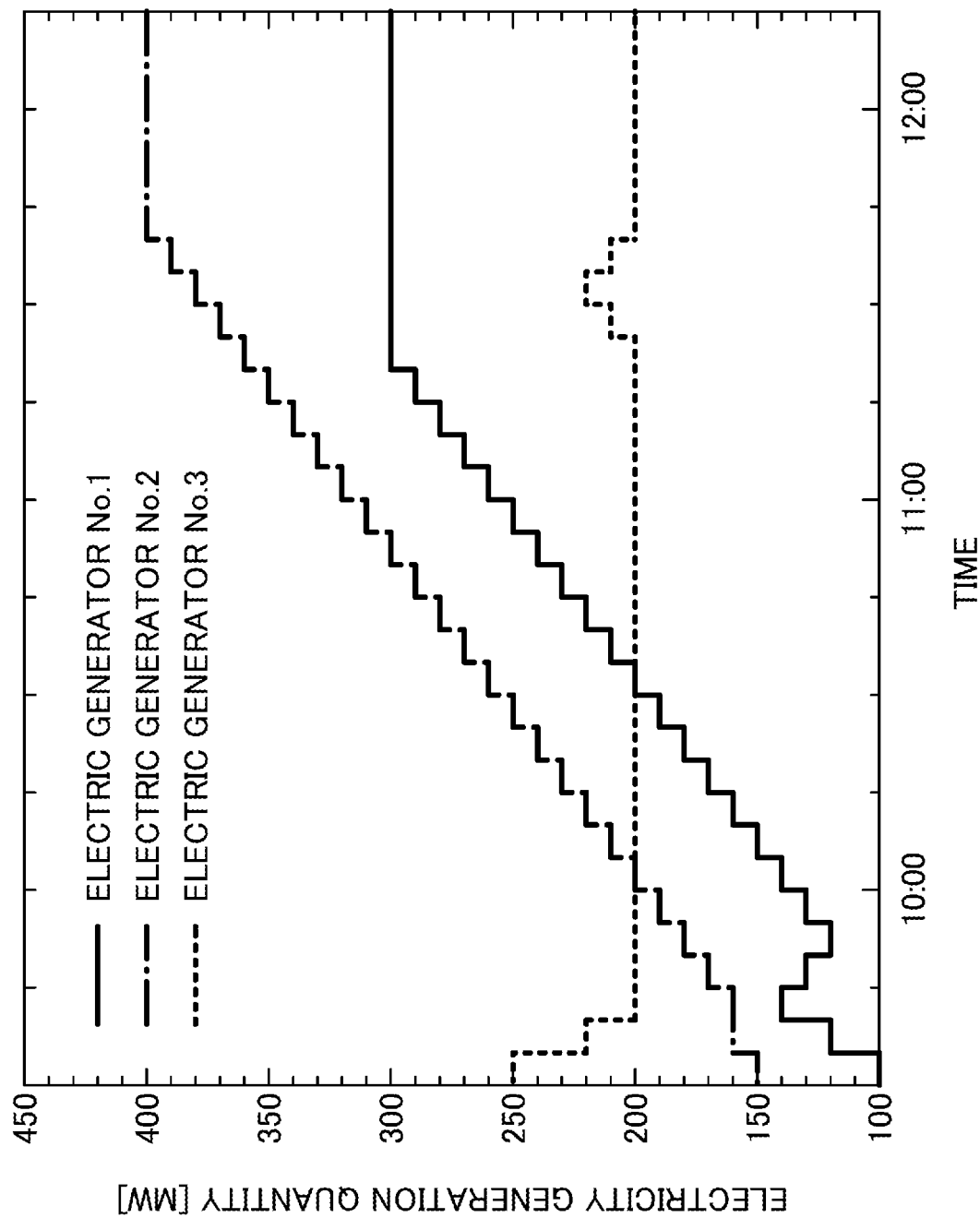
FIG. 22 is a diagram illustrating an example of the optimum supply quantity predicted values of the respective electric generators (Example 2)

Here, FIG. 22 illustrates optimum supply quantity predicted values of the respective electric generators repeatedly determined for the cross sections s (s=1, 2, 20) by the production allocation determining apparatus 10 according to the present embodiment from the time t=1 to the time t=31 with each time t as a reference by using the respective electric generators of Example 1. Conversely, FIG. 23 illustrates optimum supply quantity predicted values of the respective electric generators repeatedly determined for the cross sections s (s=1, 2, . . . , 20) by a conventional technique from the time t=1 to the time t=31 with each time t as a reference.

Figure 23:
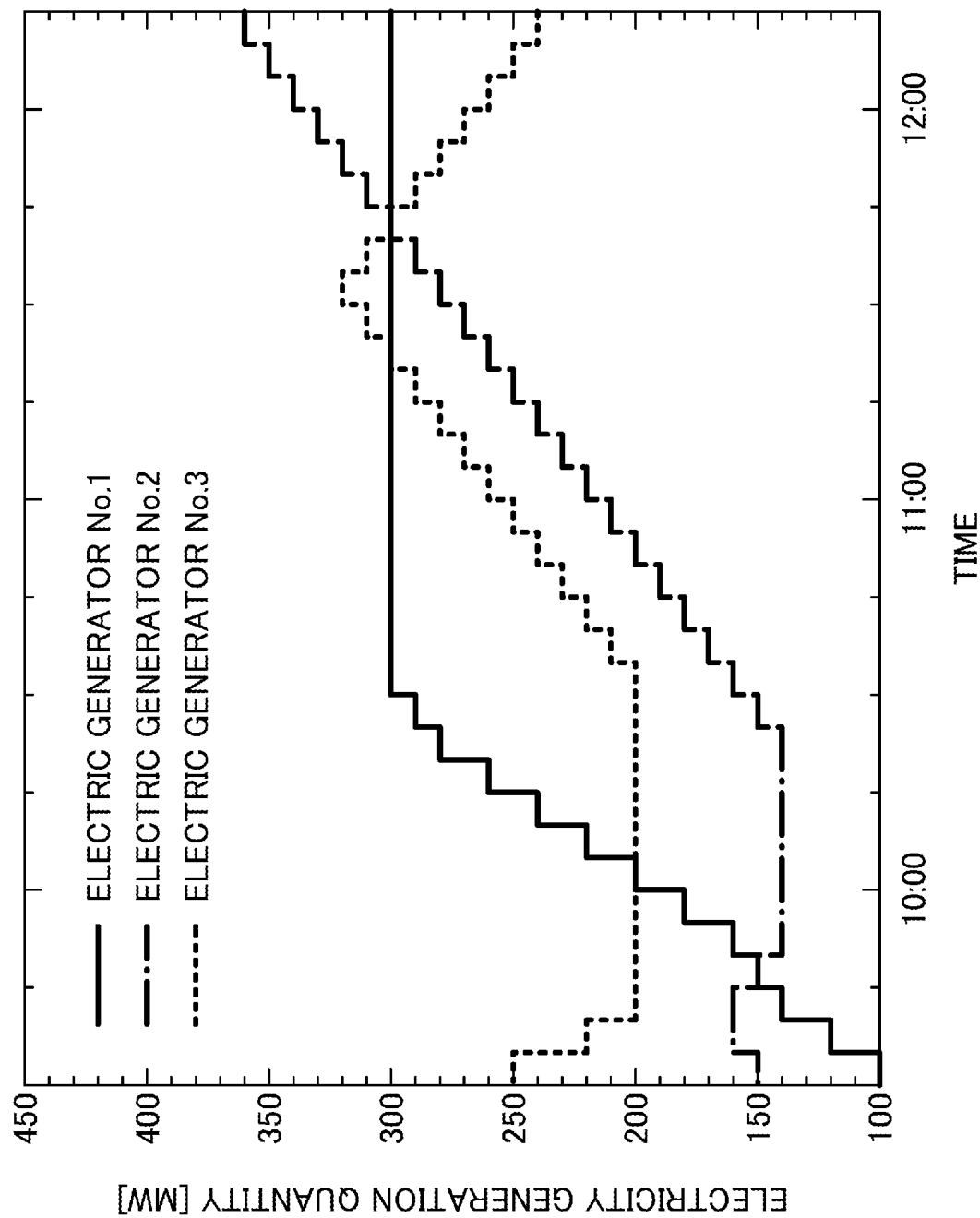
FIG. 23 is a diagram illustrating an example of the optimum supply quantity predicted values of the respective electric generators according to a conventional technique.

When comparing the electricity generation cost in FIG. 22 with the electricity generation cost in FIG. 23, it is found that the cost in FIG. 22 is 6784.79 [1000 yen] and the cost in FIG. 23 is 6879.06 [1000 yen]. Thus, it is found that the operation in FIG. 22 is more efficient.

Also, for the electricity generation cost in the period illustrated in FIG. 17, it is 3704.92 [1000 yen] in the case of FIG. 22, which is lower in cost than that of using the allocations for s=1 to s=20 calculated at t=0 without change as a described in Example 1. Note that FIG. 19 was used to calculate the electricity generation costs.

As described above, according to the production allocation determining apparatus 10 according to the present embodiment, at each time t, it is possible to determine, at each cross section s with the time t as the reference, optimum allocations in consideration of predictions of a demanded quantity and change rate constraints of producers. Thereby, it is possible to operate a demand-supply system at an optimum cost at each time t.

Here, a system 1000 including producer facilities (producers) and the production allocation determining apparatus 10 according to the embodiment described above will be described.

Figure 24:
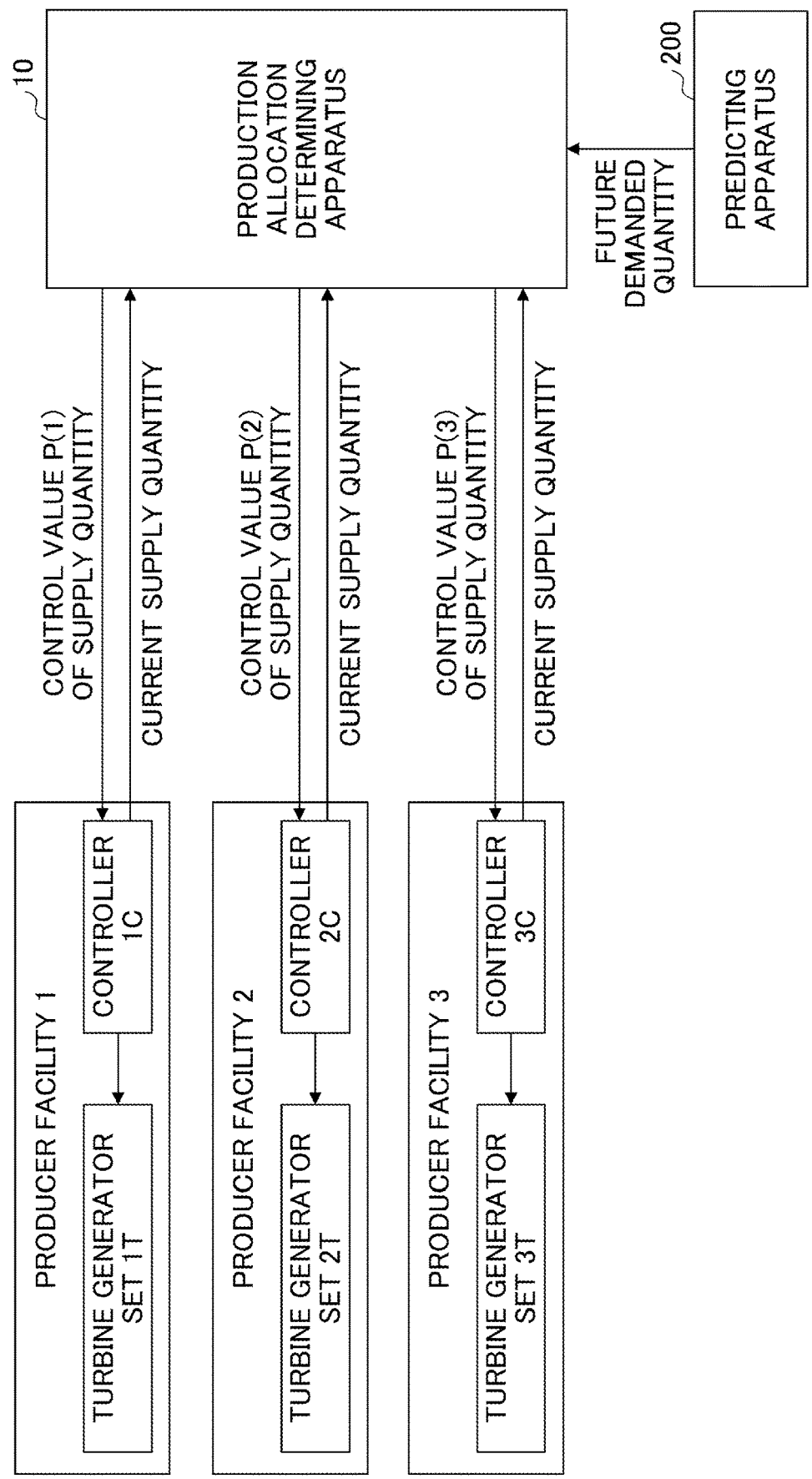
FIG. 24 is a diagram illustrating a system according to the embodiment.

FIG. 24 is a diagram illustrating the system 1000 according to the embodiment.

As illustrated in FIG. 24, the system 1000 includes the production allocation determining apparatus 10, a predicting apparatus 200, and producer facilities 1 to 3.

The respective producer facilities 1 to 3 include turbine generator sets 1T to 3T and controllers 1C to 3C. For example, the controllers 1C to 3C are connected to the production allocation determining apparatus 10 via a network.

Each of the controllers 1C to 3C and the predicting apparatus 200 has a hardware configuration as illustrated in FIG. 3.

Although the configuration and the operation of the producer facility 1 are described, each of the producer facilities 1 to 3 has a similar configuration and operates similarly.

The producer facility 1 includes the turbine generator set 1T and the controller 1C. The turbine generator set 1T includes a steam turbine and an electric generator connected to the steam turbine. By rotating the steam turbine, the electric generator is driven to generate electricity (electric power). The controller 1C controls the quantity of electricity generated by the generator by controlling the rotation of the steam turbine.

The predicting apparatus 200 is an apparatus that predicts the total quantity of electricity (resources) to be supplied by the producer facilities 1 to 3. The predicting apparatus 200 predicts the total value of the future supply quantities based on data such as past performance and a future operation plan. The predicting apparatus 200 may included in the be predicting apparatus 200 as a predicting unit.

The production allocation determining apparatus 10 receives the future demanded quantity from the prediction apparatus 200 and receives the current values of supply quantity from the controllers 1C to 3C of the respective producer facilities 1 to 3. The production allocation determining apparatus 10 executes a calculation process as described with reference to FIG. 4 to FIG. 9 to calculate, based on the received future demanded quantity and the received current values of supply quantities, the optimum supply quantities for the respective producer facilities 1 to 3. The production allocation determining apparatus 10 inputs, to the respective producer facilities 1 to 3, the calculated optimum supply quantities as control values P(1) to P(3).

Specifically, the controller 1C transmits, to the production allocation determining apparatus 10, data indicating the current supply quantity of electricity generated by the turbine generator set 1T. Similarly, to the controller 2C transmits, the production allocation determining apparatus 10, data indicating the current supply quantity of electricity generated by the turbine generator set 2T. Similarly, the controller 3C transmits, to the production allocation determining apparatus 10, data indicating the current supply quantity of electricity generated by the turbine generator set 3T.

The production allocation determining apparatus 10 executes a calculation process as described with reference to FIGS. 4 to 9 to calculate the optimum supply quantities at each time s (s=1, 2, . . . , T) for the respective producer facilities 1 to 3.

Then, the production allocation determining apparatus 10 sends, to the respective controllers 1C to 3C, instructions (signals) including the calculated optimum supply quantities. The respective controllers 1C to 3C control, based on the optimum supply quantities included in the received instructions (signals), the rotation of the turbines of the turbine generator sets 1T to 3C to cause the turbine generator sets 1T to 3C to generate the electricity by the optimum supply quantities.

It should be noted that turbine generator sets 1T to 3T may be, but are not limited to, a known generator as described in a Japanese Laid-open Patent Publication No. S62-159706. The entire contents of Japanese Laid-open Patent Publication No. S62-159706 are hereby incorporated by reference. Also, a system to which the production allocation determining apparatus 10 is applied according to the embodiment of the present disclosure is not limited to the system 1000 including turbine generator sets as s described above but may be a system including producer facilities for generating industrial energy resources, such as gas production facilities, boilers, or air-conditioning facilities. The present invention is not limited to the embodiment specifically described above, but various variations and modifications may be made without departing from the scope of claims.

What is claimed is:

1. A production allocation determining apparatus for determining and controlling optimum allocations of supply quantities of energy to be produced and supplied to a predetermined consumer by a plurality of producers at a point of time s (s=1, 2, . . . , T) representing future times where the point of time s=1 represents a nearest future time and the point of time s=T represents a predetermined farthest future time, said T being a predetermined integer greater than 0, a time interval between the point of time s and point of time s+1 being predetermined, the production allocation determining apparatus comprising:

a memory; and a processor that is coupled to the memory and that is configured to:

calculate, from supply function models representing relationships between supply quantities and marginal costs of respective producers, a total supply function model representing a relationship between a total supply quantity and a marginal cost of the plurality of producers;

calculate, based on current supply quantities of the respective producers, based on change rate constraints of the supply quantities of the respective producers, and based on capacity upper limits and capacity lower limits indicating upper limits and lower limits of supply capacities of the respective producers, supply quantity upper limits and supply quantity lower limits indicating upper limits and lower limits of the supply quantities of the respective producers to the predetermined consumer at the point of time s;

calculate an optimum price indicating a marginal cost at the point of time s based on the total supply function model, based on a predicted value of a demanded quantity at the point of time s, and based on the supply quantity upper limits and the supply quantity lower limits;

calculate, based on the supply quantity upper limits and the supply quantity lower limits of the respective producers at the point of time s, based on the supply function models of the respective producers, and based on the optimum price at the point of time s, optimum supply quantities indicating allocations of the supply quantities of the respective producers at the point of time s to the predetermined consumer; and output the calculated optimum supply quantities, wherein by substituting L[s], max[k][s], and min[k][s] into φ(L, λ, min[1], . . . , min[N], max[1], . . . , max[N]), the processor calculates the optimum price that is λ[s] at the point of time s, where φ(L, λ, min[1], . . . , min[N], max[1], ... max[N]) indicates the total supply function model, L[s] indicates the predicted value of the demanded quantity for the predetermined consumer at the point of time s, and max[k][s] and min[k][s] indicate the supply quantity upper limits and the supply quantity lower limits of each of the respective producers k for the predetermined consumer at the point of time s, said max[k][s] of each of the respective producers k being variables, and said min[k][s] of each of the respective producers k being variables, where the processor sets, as the supply upper limit max[k][s] for each of the producers k, a smaller one of a capacity upper limit that is produced by a corresponding producer and an upper limit quantity that is produced by the corresponding producer at the point of time s when the supply quantity is changed from a current value in consideration of a change rate constraint of the corresponding producer, and the processor sets, as the supply lower limit min[k][s] for each of the producers k, a larger one of a capacity lower limit that is produced by a corresponding producer and a lower limit quantity that is produced by the corresponding producer at the point of time s when the supply quantity is changed from a current value in consideration of a change rate constraint of the corresponding producer, wherein a cycle of calculation of the supply quantity upper limits max[k][s] and the supply quantity lower limits min[k][s], calculation of the optimum price, and calculation of the optimum supply quantities is executed for each of the point of time s (s=1, 2, ..., T) by starting with an execution of the cycle for a point of time s=T that is the predetermined farthest future time and shifting toward a point of time s=1 that is the nearest future time, one point of time by one point of time, thereby determining an optimum supply quantity of each of the respective producers k at each of respective point of time s, wherein the processor controls the respective producers to physically transfer and supply the energy based on the calculated optimum quantities, wherein the respective producers include turbine generator sets and controllers, wherein the controllers control the turbine generator sets to control quantities of electricity generated by the turbine generator sets, wherein the processor of the production allocation determining apparatus sends, to the respective controllers, signals including the calculated optimum supply quantities to cause the respective controllers to drive, based on the optimum supply quantities included in the received signals, the turbine generator sets to generate the electricity by the optimum supply quantities, wherein, the processor calculates an initial supply quantity upper limit max[k][s] by setting, as the initial supply quantity upper limit max[k][s] for the predetermined consumer at the point of time s=T for each of the respective producers, a smaller one of a first upper limit quantity that is produced by the corresponding producer, calculated based on the current supply quantity of the corresponding producer and the change rate constraint of the corresponding producer, and the capacity upper limit of the corresponding producer, wherein, the processor calculates an initial supply quantity lower limit min[k][s] by setting, as the initial supply quantity lower limit min[k][s] for the predetermined consumer at the point of time s=T for each of the respective producers, a larger one of a first lower limit quantity that is produced by the corresponding producer, calculated based on the current supply quantity of the corresponding producer and the change rate constraint of the corresponding producer, and the capacity lower limit of the corresponding producer, wherein, after calculating the initial supply quantity upper limit max[k][s] and the initial supply quantity lower limit min[k][s], for each of the respective producers, the processor:

calculates a second upper limit quantity that is produced by the corresponding producer at the point of time s+1 when s<T based on the optimum supply quantity of the corresponding producer at the point of time s+1 calculated by the processor and based on the change rate constraint of the corresponding producer, said point of time s+1 being further future relative to the point of time s, and sets, as the supply quantity upper limit max[k][s] that is produced by the corresponding producer for the predetermined consumer at the point of time s when s<T, a smallest one of:
the first upper limit quantity calculated based on the current supply quantity and the change rate constraint,
the second upper limit quantity calculated based on the optimum supply quantity at the point of time s+1 calculated by the processor and based on the change rate constraint, and
the capacity upper limit, and wherein, after calculating the initial supply quantity upper limit max[k][s] and the initial supply quantity lower limit min[k][s], the processor:

calculates a second lower limit quantity that is produced by the corresponding producer at the point of time s+1 when s<T calculated based on the optimum supply quantity of the corresponding producer at the point of time s+1 calculated by the processor and based on the change rate constraint, said point of time s+1 being further future relative to the point of time s, and sets, as the supply quantity lower limit min[k][s] that is produced by the corresponding producer for the predetermined consumer at the point of time s, a largest one of:
the first lower limit quantity calculated based on the current supply quantity and the change rate constraint,
the second lower limit quantity calculated based on the optimum supply quantity at the point of time s+1 calculated by the processor and based on the change rate constraint, and
the capacity lower limit.

2. The production allocation determining apparatus according to claim 1, wherein the processor compares, for each of the respective producers, a marginal cost lower limit and a marginal cost upper limit calculated from a supply quantity upper limit, a supply quantity lower limit, and a supply function model at the point of time s, with the optimum price at the point of time s, wherein when the optimum price is less than the marginal cost lower limit, the processor sets, as an optimum supply quantity of a corresponding producer at the point of time s, the supply quantity lower limit of the corresponding producer, wherein when the optimum price is greater than or equal to the marginal cost lower limit and less than or equal to the marginal cost upper limit, the processor sets, as an optimum supply quantity of a corresponding producer at the point of time s, a supply quantity corresponding to the optimum price in the supply function model of the corresponding producer, and wherein when the optimum price exceeds the marginal cost upper limit, the processor sets, as an optimum supply quantity of a corresponding producer at the point of time s, the supply quantity upper limit of the corresponding producer.

3. The production allocation determining apparatus according to claim 1, wherein by applying a quantifier elimination method to a first-order predicate formula obtained by using a variable indicating the total supply quantity, a variable indicating the marginal cost, variables indicating the supply quantities of the respective producers, variables indicating the supply upper limits of the respective producers, variables indicating the supply lower limits of the respective producers, and logic symbols, the processor calculates the total supply function model representing a relationship between the variable indicating the total supply quantity, the variable indicating the marginal cost, the variables indicating the supply upper limits of the respective producers, and the variables indicating the supply lower limits of the respective producers.

4. The production allocation determining apparatus according to claim 1, further comprising:

an input device to which the current values of the supply quantities of the respective producers and a predicted value of the demanded quantity at each point of time s for the respective producers are input for each predetermined control cycle t, wherein, upon the current values of the supply quantities of the respective producers and the predicted value of the demanded quantity at each point of time s for the respective producers being input through the input device, the calculation of the supply quantity upper limits and the supply quantity lower limits by the processor, the calculation of the optimum price by the optimum price calculation unit, and the calculation of the optimum supply quantities by the processor are repeatedly executed from the point of time s=T to the points of time s=1, and wherein the processor outputs, for each predetermined control cycle t, the optimum supply quantities at the point of time s=1.

5. A system comprising:
the production allocation determining apparatus according to claim 1; and
the plurality of producers including the turbine generator sets and the controllers,
wherein each of the turbine generator sets includes a steam turbine and an electric generator connected to the steam turbine.

6. The production allocation determining apparatus according to claim 1, wherein the processor calculates:

the second upper limit quantity calculated based on the optimum supply quantity at the points of time s+1 calculated by the processor and based on the change rate constraint as a candidate for the supply quantity upper limit for the predetermined consumer at the points of time s, and the second lower limit quantity calculated based on the optimum supply quantity at the points of time s+1 calculated by the processor and based on the change rate constraint as a candidate for the supply quantity lower limit for the predetermined consumer at the points of time s.

7. The production allocation determining apparatus according to claim 1, wherein the change rate constraint is predetermined for each of the plurality of producers and represents condition representing a quantity and/or a rate at which each of the plurality of producers changes a production quantity of a product per unit time.

8. A production allocation determining method that is performed by a memory and a processor that is coupled to the memory for determining and controlling optimum allocations of supply quantities of energy to be produced and supplied to a predetermined consumer by a plurality of producers with respect to a point of time s (s=1, 2, ..., T) representing future times where the point of time s=1 represents a nearest future time and the point of time s=T represents a predetermined farthest future time, said T being a predetermined integer greater than 0, a time interval between the point of time s and point of time s+1 being predetermined, the method comprising:

calculating, from supply function models representing relationships between supply quantities and marginal costs of respective producers, a total supply function model representing a relationship between a total supply quantity and a marginal cost of the plurality of producers;

calculating, based on current supply quantities of the respective producers, based on change rate constraints of the supply quantities of the respective producers, and based on capacity upper limits and capacity lower limits indicating upper limits and lower limits of supply capacities of the respective producers, supply quantity upper limits and supply quantity lower limits indicating upper limits and lower limits of the supply quantities of the respective producers to the predetermined consumer at the cross section s;

calculating an optimum price indicating a marginal cost at the point of time s based on the total supply function model, based on a predicted value of a demanded quantity at the point of time s, and based on the supply quantity upper limits and the supply quantity lower limits;

calculating, based on the supply quantity upper limits and the supply quantity lower limits of the respective producers at the point of time s, based on the supply function models of the respective producers, and based on the optimum price at the point of time s, optimum supply quantities indicating allocations of the supply quantities of the respective producers at the point of time s to the predetermined consumer; and outputting the calculated optimum supply quantities, wherein by substituting L[s], max[k][s], and min[k][s] into φ(L, λ, min[1], ..., min[N], max[1], ..., max[N]), the processor calculates the optimum price that is λ[s] at the cross section s, where φ(L, λ, min[1], ..., min[N], max[1] ..., max[N]) indicates the total supply function model, L[s] indicates the predicted value of the demanded quantity for the predetermined consumer at the point of time s, and max[k][s] and min[k][s] indicate the supply quantity upper limits and the supply quantity lower limits of each of the respective producers k for the predetermined consumer at the cross section s, said max[k][s] of each of the respective producers k being variables, and said min[k][s] of each of the respective producers k being variables, where the processor sets, as the supply upper limit max[k][s] for each of the producers k, a smaller one of a capacity upper limit that is produced by a corresponding producer and an upper limit quantity that is produced by the corresponding producer at the cross section s when the supply quantity is changed from a current value in consideration of a change rate constraint of the corresponding producer, and the upper and lower limit calculation unit sets, as the supply lower limit min[k][s] for each of the producers k, a larger one of a capacity lower limit that is produced by a corresponding producer and a lower limit quantity that is produced by the corresponding producer at the point of time s when the supply quantity is changed from a current value in consideration of a change rate constraint of the corresponding producer, wherein a cycle of calculation of the supply quantity upper limits and the supply quantity lower limits, calculation of the optimum price, and calculation of the optimum supply quantities is executed for each of the point of time s (s=1, 2, . . . , T) by starting with an execution of the cycle for the point of time s=T that is the predetermined farthest future time and shifting toward the point of time s=1 that is the nearest future time, one point of time by one point of time, thereby determining an optimum supply quantity of each of respective producers k at each of respective points of time, wherein the processor controls the respective producers to physically transfer and supply the energy based on the calculated optimum quantities, wherein the respective producers include turbine generator sets and controllers, wherein the controllers control the turbine generator sets to control quantities of electricity generated by the turbine generator sets, and wherein the processor sends, to the respective controllers, signals including the calculated optimum supply quantities to cause the respective controllers to drive, based on the optimum supply quantities included in the received signals, the turbine generator sets to generate the electricity by the optimum supply quantities, wherein, the processor calculates an initial supply quantity upper limit max[k][s] by setting, as the initial supply quantity upper limit max[k][s] for the predetermined consumer at the point of time s=T for each of the respective producers, a smaller one of a first upper limit quantity that is produced by the corresponding producer, calculated based on the current supply quantity of the corresponding producer and the change rate constraint, and the capacity upper limit of the corresponding producer, wherein, the processor calculates an initial supply quantity lower limit min[k][s] by setting, as the initial supply quantity lower limit min[k][s] for the predetermined consumer at the points of time s=T for each of the respective producers, a larger one of a first lower limit quantity that is produced by the corresponding producer, calculated based on the current supply quantity of the corresponding producer and the change rate constraint, and the capacity lower limit of the corresponding producer, wherein, after calculating the initial supply quantity upper limit max[k][s] and the initial supply quantity lower limit min[k][s] for each of the respective producers, the processor:
  calculates a second upper limit quantity that is produced by the corresponding producer at the points of time s+1 when s<T based on the optimum supply quantity of the corresponding producer at the points of time s+1 calculated by the processor and based on the change rate constraint of the corresponding producer, said the points of time s+1 being further future relative to the cross section s, and
  sets, as the supply quantity upper limit max[k][s] that is produced by the corresponding producer for the predetermined consumer at the points of time s, a smallest one of:
    the first upper limit quantity calculated based on the current supply quantity and the change rate constraint,
    the second upper limit quantity calculated based on the optimum supply quantity at the points of time s+1 calculated by the processor and based on the change rate constraint, and
    the capacity upper limit, and wherein, after calculating the initial supply quantity upper limit max[k][s] and the initial supply quantity lower limit min[k][s], for each of the respective producers, the processor:
  calculates a second lower limit quantity that is able to be produced by the corresponding producer at the points of time s+1 calculated based on the optimum supply quantity of the corresponding producer at the points of time s+1 calculated by the processor and based on the change rate constraint, said the points of time s+1 being further future relative to the points of time s, and
  sets, as the supply quantity lower limit min[k][s] that is able to be produced by the corresponding producer for the predetermined consumer at the cross section s, a largest one of:
    the first lower limit quantity calculated based on the current supply quantity and the change rate constraint,
    the second lower limit quantity calculated based on the optimum supply quantity at the points of time s+1 calculated by the processor and based on the change rate constraint, and
    the capacity lower limit.

* * * * *

UNITED STATES PATENT AND TRADEMARK OFFICE
CERTIFICATE OF CORRECTION

| | | |
|---|---|---|
| PATENT NO. | : 12,198,207 B2 | Page 1 of 1 |
| APPLICATION NO. | : 17/236294 | |
| DATED | : January 14, 2025 | |
| INVENTOR(S) | : Satoshi Kiryu and Yoshio Tange | |

It is certified that error appears in the above-identified patent and that said Letters Patent is hereby corrected as shown below:

On the Title Page

Item (54) and in the Specification Column 1, Lines 1-3 Please Correct:
PRODUCTION ALLOCATION DETERMINING APPARATUS AND PRODUCTION ALLOCATION To:
PRODUCTION ALLOCATION DETERMINING APPARATUS AND PRODUCTION ALLOCATION DETERMINING METHOD Signed and Sealed this
Twenty-fifth Day of February, 2025

Coke Morgan Stewart
*Acting Director of the United States Patent and Trademark Office*